US008606626B1

(12) United States Patent
DeSoto et al.

(10) Patent No.: US 8,606,626 B1
(45) Date of Patent: Dec. 10, 2013

(54) SYSTEMS AND METHODS FOR PROVIDING A DIRECT MARKETING CAMPAIGN PLANNING ENVIRONMENT

(75) Inventors: Laura J. DeSoto, Newport Beach, CA (US); Michele M. Bodda, Irvine, CA (US); Kristi Ann Adkinson, Algonquin, IL (US); Venkat R. Achanta, Irvine, CA (US); Felicia Peng, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 1414 days.

(21) Appl. No.: 12/022,874

(22) Filed: Jan. 30, 2008

Related U.S. Application Data

(60) Provisional application No. 60/887,521, filed on Jan. 31, 2007.

(51) Int. Cl.
*G06Q 40/00* (2012.01)
*G06Q 30/00* (2012.01)

(52) U.S. Cl.
CPC ..................................... *G06Q 30/00* (2013.01)
USPC ................ 705/14; 705/300; 705/10; 705/26; 705/14.26; 705/7.29; 705/14.64; 707/727; 709/203

(58) Field of Classification Search
USPC ............... 700/108; 702/185; 714/25; 705/14, 705/14.26, 14.64, 300; 707/748; 709/202, 709/203
See application file for complete search history.

(56) References Cited

U.S. PATENT DOCUMENTS 4,775,935 A 10/1988 Yourick
4,982,346 A 1/1991 Girouard et al.
5,201,010 A 4/1993 Deaton et al.
5,283,731 A 2/1994 Lalonde et al.

(Continued)

FOREIGN PATENT DOCUMENTS

CN 1290373 5/2001
DE 9108341 10/1991

(Continued)

OTHER PUBLICATIONS

"Atlas on Demand, Concurrent, and Everstream Strike Video-On-Demand Advertising Alliance", atlassolutions.com, Jul. 13, 2006, 3 pages.

(Continued)

*Primary Examiner* — Tien Nguyen
(74) *Attorney, Agent, or Firm* — Knobbe Martens Olson & Bear, LLP

(57) ABSTRACT

Embodiments of system are disclosed in which selection strategies for a direct marketing campaign that identify consumers from a credit bureau or other consumer database can be planned, tested, and/or refined on a stable subset of the credit database. In some embodiments, once refined, consumer selection criteria may be used to execute the direct marketing campaign on the full consumer/credit database, which is preferably updated approximately twice weekly. In one preferred embodiment, the data for the test database represents a random sampling of approximately 10% of the full database and the sampling is regenerated approximately weekly in order to provide a stable set of data on which campaign developers may test their campaign. For each consumer in the sampling, the environment may allow a client to access and use both attributes calculated by the credit bureau and proprietary attributes and data owned by the client. The system allows for a plurality of clients to use the system substantially simultaneously while protecting the privacy and integrity of the client's proprietary data and results.

20 Claims, 9 Drawing Sheets

(56) References Cited

U.S. PATENT DOCUMENTS 5,305,195 A 4/1994 Murphy
5,454,030 A 9/1995 de Oliveira et al.
5,459,306 A 10/1995 Stein et al.
5,504,675 A 4/1996 Cragun et al.
5,515,098 A 5/1996 Carles
5,521,813 A 5/1996 Fox et al.
5,563,783 A 10/1996 Stolfo et al.
5,583,763 A 12/1996 Atcheson et al.
5,592,560 A 1/1997 Deaton et al.
5,627,973 A 5/1997 Armstrong et al.
5,649,114 A 7/1997 Deaton et al.
5,661,516 A 8/1997 Carles
5,692,107 A 11/1997 Simoudis et al.
5,696,907 A 12/1997 Tom
5,724,521 A 3/1998 Dedrick
5,740,549 A 4/1998 Reilly et al.
5,745,654 A 4/1998 Titan
5,774,868 A 6/1998 Cragun et al.
5,802,142 A 9/1998 Browne
5,819,226 A 10/1998 Gopinathan et al.
5,848,396 A 12/1998 Gerace
5,857,175 A 1/1999 Day et al.
5,870,721 A 2/1999 Norris
5,873,068 A 2/1999 Beaumont et al.
5,884,287 A 3/1999 Edesess
5,893,090 A * 4/1999 Friedman et al. .................... 1/1
5,912,839 A 6/1999 Ovshinsky et al.
5,926,800 A 7/1999 Baronowski et al.
5,933,813 A 8/1999 Teicher et al.
5,944,790 A 8/1999 Levy
5,953,707 A 9/1999 Huang et al.
5,974,396 A 10/1999 Anderson et al.
5,991,735 A 11/1999 Gerace
6,029,139 A 2/2000 Cunningham et al.
6,044,357 A 3/2000 Garg
6,070,147 A 5/2000 Harms et al.
6,101,486 A 8/2000 Roberts et al.
6,119,103 A 9/2000 Basch et al.
6,144,948 A 11/2000 Walker et al.
6,208,979 B1 3/2001 Sinclair
6,236,977 B1 5/2001 Verba et al.
6,269,325 B1 7/2001 Lee et al.
6,289,318 B1 9/2001 Barber
6,298,330 B1 10/2001 Gardenswartz et al.
6,317,752 B1 11/2001 Lee et al.
6,321,205 B1 11/2001 Eder
6,324,566 B1 11/2001 Himmel et al.
6,330,546 B1 12/2001 Gopinathan et al.
6,334,110 B1 12/2001 Walter et al.
6,385,592 B1 5/2002 Angles et al.
6,393,406 B1 5/2002 Eder
6,412,012 B1 6/2002 Bieganski et al.
6,424,956 B1 7/2002 Werbos
6,430,539 B1 8/2002 Lazarus et al.
6,442,577 B1 8/2002 Britton et al.
6,460,036 B1 10/2002 Herz
6,505,168 B1 1/2003 Rothman et al.
6,513,018 B1 1/2003 Culhane
6,542,894 B1 4/2003 Lee et al.
6,597,775 B2 7/2003 Lawyer et al.
6,615,247 B1 9/2003 Murphy
6,623,529 B1 9/2003 Lakritz
6,640,215 B1 10/2003 Galperin et al.
6,665,715 B1 12/2003 Houri
6,748,426 B1 6/2004 Shaffer et al.
6,757,740 B1 6/2004 Parekh et al.
6,782,390 B2 8/2004 Lee et al.
6,810,356 B1 10/2004 Garcia-Franco et al.
6,823,319 B1 11/2004 Lynch et al.
6,839,682 B1 1/2005 Blume et al.
6,850,606 B2 2/2005 Lawyer et al.
6,873,979 B2 3/2005 Fishman et al.
6,901,406 B2 5/2005 Nabe et al.
6,925,441 B1 8/2005 Jones, III et al.
6,959,281 B1 10/2005 Freeling et al.
6,983,478 B1 1/2006 Grauch et al.
6,993,493 B1 1/2006 Galperin et al.
7,003,792 B1 2/2006 Yuen
7,033,792 B2 4/2006 Zhong et al.
7,072,853 B2 7/2006 Shkedi
7,072,963 B2 7/2006 Anderson et al.
7,150,030 B1 12/2006 Eldering et al.
7,152,018 B2 12/2006 Wicks
7,152,237 B2 12/2006 Flickinger et al.
7,185,353 B2 2/2007 Schlack
7,240,059 B2 7/2007 Bayliss et al.
7,275,083 B1 9/2007 Seibel et al.
7,296,734 B2 11/2007 Pliha
7,360,251 B2 4/2008 Spalink et al.
7,366,694 B2 4/2008 Lazerson
7,383,215 B1 6/2008 Navarro et al.
7,424,439 B1 9/2008 Fayyad et al.
7,428,509 B2 9/2008 Klebanoff
7,433,855 B2 10/2008 Gavan et al.
7,458,508 B1 12/2008 Shao
7,472,088 B2 12/2008 Taylor et al.
7,499,868 B2 3/2009 Galperin et al.
7,546,619 B2 6/2009 Anderson et al.
7,556,192 B2 7/2009 Wokaty, Jr.
7,562,184 B2 7/2009 Henmi et al.
7,571,139 B1 8/2009 Giordano et al.
7,580,856 B1 8/2009 Pliha
7,590,589 B2 9/2009 Hoffberg
7,610,257 B1 10/2009 Abrahams
7,653,592 B1 1/2010 Flaxman et al.
7,668,769 B2 2/2010 Baker et al.
7,668,840 B2 2/2010 Bayliss et al.
7,672,865 B2 3/2010 Kumar et al.
7,686,214 B1 3/2010 Shao et al.
7,698,236 B2 4/2010 Cox et al.
7,730,509 B2 6/2010 Boulet et al.
7,793,835 B1 9/2010 Coggeshall
2001/0039523 A1 11/2001 Iwamoto
2002/0023051 A1 2/2002 Kunzle et al.
2002/0046099 A1 4/2002 Frengut et al.
2002/0049968 A1 4/2002 Wilson et al.
2002/0055906 A1 5/2002 Katz et al.
2002/0077964 A1 6/2002 Brody et al.
2002/0082892 A1 6/2002 Raffel et al.
2002/0123904 A1 9/2002 Amengual et al.
2002/0128960 A1 9/2002 Lambiotte et al.
2002/0129368 A1 9/2002 Schlack et al.
2002/0133404 A1 9/2002 Pedersen
2002/0147695 A1 10/2002 Khedkar et al.
2002/0194103 A1 12/2002 Nabe
2003/0033242 A1 2/2003 Lynch et al.
2003/0036996 A1 2/2003 Lazerson
2003/0065563 A1 4/2003 Elliott et al.
2003/0097329 A1 5/2003 Nabe et al.
2003/0195830 A1 10/2003 Merkoulovitch et al.
2003/0212618 A1 11/2003 Keyes et al.
2003/0216965 A1 11/2003 Libman
2003/0217003 A1 11/2003 Weinflash et al.
2003/0233323 A1 12/2003 Bilski et al.
2004/0030667 A1 2/2004 Xu et al.
2004/0039686 A1 2/2004 Klebanoff
2004/0044615 A1 3/2004 Xue et al.
2004/0044617 A1 3/2004 Lu
2004/0062213 A1 4/2004 Koss
2004/0078809 A1 4/2004 Drazin
2004/0102197 A1 5/2004 Dietz
2004/0107125 A1 6/2004 Guheen et al.
2004/0111305 A1 6/2004 Gavan et al.
2004/0111363 A1 6/2004 Trench et al.
2004/0122730 A1 6/2004 Tucciarone et al.
2004/0122735 A1 6/2004 Meshkin
2004/0139025 A1 7/2004 Coleman
2004/0163101 A1 8/2004 Swix
2004/0177030 A1 9/2004 Shoham
2004/0193535 A1 9/2004 Barazesh
2004/0199462 A1 10/2004 Starrs
2004/0199584 A1 10/2004 Kirshenbaum et al.
2004/0205157 A1 10/2004 Bibelnieks et al.
2005/0021397 A1 1/2005 Cui et al.

2005/0027632 A1 2/2005 Zeitoun et al.
2005/0050027 A1 3/2005 Yeh et al.
2005/0086579 A1* 4/2005 Leitner et al. ................ 715/500
2005/0102226 A1 5/2005 Oppenheimer et al.
2005/0125350 A1 6/2005 Tidwell et al.
2005/0130704 A1 6/2005 McParland et al.
2005/0144067 A1 6/2005 Farahat et al.
2005/0154664 A1 7/2005 Guy et al.
2005/0209922 A1 9/2005 Hofmeister
2005/0222906 A1 10/2005 Chen
2005/0251820 A1 11/2005 Stefanik et al.
2005/0262158 A1* 11/2005 Sauermann .................. 707/200
2005/0278246 A1 12/2005 Friedman et al.
2005/0278743 A1 12/2005 Flickinger et al.
2005/0279824 A1 12/2005 Anderson et al.
2005/0288954 A1 12/2005 McCarthy et al.
2006/0004731 A1 1/2006 Seibel et al.
2006/0041443 A1 2/2006 Horvath
2006/0059073 A1 3/2006 Walzak
2006/0080233 A1 4/2006 Mendelovich et al.
2006/0080251 A1 4/2006 Fried et al.
2006/0129428 A1 6/2006 Wennberg
2006/0178971 A1 8/2006 Owen et al.
2006/0206379 A1 9/2006 Rosenberg
2006/0212353 A1 9/2006 Roslov et al.
2006/0224696 A1 10/2006 King et al.
2006/0229943 A1 10/2006 Mathias et al.
2006/0229996 A1* 10/2006 Keithley et al. ................ 705/75
2006/0242039 A1 10/2006 Haggerty et al.
2006/0242046 A1 10/2006 Haggerty et al.
2006/0242050 A1 10/2006 Haggerty et al.
2006/0287915 A1 12/2006 Boulet et al.
2006/0287919 A1 12/2006 Rubens et al.
2006/0293921 A1 12/2006 McCarthy et al.
2006/0293954 A1 12/2006 Anderson et al.
2006/0293955 A1 12/2006 Wilson et al.
2006/0294199 A1 12/2006 Bertholf
2007/0011020 A1 1/2007 Martin
2007/0011039 A1 1/2007 Oddo
2007/0022032 A1 1/2007 Anderson et al.
2007/0033227 A1 2/2007 Gaito et al.
2007/0061195 A1 3/2007 Liu et al.
2007/0061243 A1 3/2007 Ramer et al.
2007/0067297 A1 3/2007 Kublickis
2007/0067437 A1* 3/2007 Sindambiwe ................ 709/224
2007/0078835 A1 4/2007 Donnelli
2007/0083460 A1 4/2007 Bachenheimer
2007/0106582 A1 5/2007 Baker et al.
2007/0192165 A1 8/2007 Haggerty et al.
2007/0192409 A1 8/2007 Kleinstern et al.
2007/0208619 A1 9/2007 Branam et al.
2007/0214076 A1 9/2007 Robida et al.
2007/0226093 A1 9/2007 Chan et al.
2007/0226130 A1 9/2007 Haggerty et al.
2007/0233857 A1 10/2007 Cheng et al.
2007/0244732 A1 10/2007 Chatterji et al.
2007/0282684 A1 12/2007 Prosser et al.
2007/0288271 A1 12/2007 Klinkhammer
2007/0288950 A1 12/2007 Downey et al.
2007/0288953 A1 12/2007 Sheeman et al.
2008/0005313 A1 1/2008 Flake et al.
2008/0010206 A1 1/2008 Coleman
2008/0021802 A1 1/2008 Pendleton
2008/0028067 A1 1/2008 Berkhin et al.
2008/0059317 A1 3/2008 Chandran et al.
2008/0065774 A1 3/2008 Keeler
2008/0097928 A1* 4/2008 Paulson ......................... 705/80
2008/0103972 A1 5/2008 Lanc
2008/0120155 A1 5/2008 Pliha
2008/0147454 A1 6/2008 Walker et al.
2008/0167883 A1 7/2008 Thavildar
2008/0177836 A1 7/2008 Bennett
2008/0184289 A1 7/2008 Cristofalo et al.
2008/0228635 A1 9/2008 Megdal et al.
2008/0255897 A1 10/2008 Megdal et al.
2008/0294540 A1 11/2008 Celka et al.
2008/0301727 A1 12/2008 Cristofalo et al.
2009/0018996 A1 1/2009 Hunt et al.
2009/0044246 A1 2/2009 Sheehan et al.
2009/0044279 A1 2/2009 Crawford et al.
2009/0094640 A1 4/2009 Anderson et al.
2009/0133058 A1 5/2009 Kouritzin et al.
2009/0182653 A1 7/2009 Zimiles
2009/0199264 A1 8/2009 Lang
2009/0222308 A1 9/2009 Zoldi et al.
2009/0222373 A1 9/2009 Haggerty et al.
2009/0222374 A1 9/2009 Haggerty et al.
2009/0222375 A1 9/2009 Haggerty et al.
2009/0222376 A1 9/2009 Haggerty et al.
2009/0222377 A1 9/2009 Haggerty et al.
2009/0222378 A1 9/2009 Haggerty et al.
2009/0222379 A1 9/2009 Haggerty et al.
2009/0222380 A1 9/2009 Haggerty et al.
2009/0248567 A1 10/2009 Haggerty et al.
2009/0248568 A1 10/2009 Haggerty et al.
2009/0248569 A1 10/2009 Haggerty et al.
2009/0248570 A1 10/2009 Haggerty et al.
2009/0248571 A1 10/2009 Haggerty et al.
2009/0248572 A1 10/2009 Haggerty et al.
2009/0248573 A1 10/2009 Haggerty et al.
2009/0288109 A1 11/2009 Downey et al.
2010/0037255 A1 2/2010 Sheehan et al.
2010/0138290 A1 6/2010 Zschocke et al.
2010/0145836 A1 6/2010 Baker et al.
2011/0047071 A1 2/2011 Haggerty et al.
2011/0093383 A1 4/2011 Haggerty et al.
2011/0112958 A1 5/2011 Haggerty et al.

FOREIGN PATENT DOCUMENTS

EP 0 554 083 8/1993
EP 0 554 083 A2 8/1993
EP 0 749 081 A1 12/1996
EP 0749081 A1 12/1996
EP 1 122 664 8/2001
JP 2003-016261 1/2003
TW 256569 6/2006
WO WO 94/06103 3/1994
WO WO 97/23838 7/1997
WO WO 99/04350 1/1999
WO WO 99/22328 5/1999
WO WO 99/33012 7/1999
WO WO 99/46710 9/1999
WO WO 00/55789 9/2000
WO WO 00/55790 9/2000
WO WO 01/11522 2/2001
WO WO 01/25896 4/2001
WO WO 01/75754 10/2001
WO WO 03/101123 12/2003
WO WO 2007/149941 12/2007

OTHER PUBLICATIONS

"Epsilon Leads Discussion on Paradigm Shift in TV Advertising," epsilon.com, Jun. 24, 2004, 2 pages, http://www.epsilon.com/who-pr_tvad040624.html.

"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.

"Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=4282.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Arbitron 2006 Black Consumers," Arbitron Inc., lvtsg.com, Jul. 8, 2006, 2 pages, http://www.lvtsg.com/news/publish/Factoids/article_3648.shtml.

"Atlas On Demand and C-COR Join Forces to Offer Advertising Management Solution for On Demand TV: Global Provider of On Demand Systems Partners with Atlas to Develop and Market Comprehensive VOD Advertising Solution," atlassolutions.com, Jul. 25, 2005, 3 pages.

(56) References Cited

OTHER PUBLICATIONS

"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar," Jun. 22, 2006, 3 pages.
"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.
"Claritas Forms Life Insurance Consortium with Worldwide Financial Services Association: Initiative with LIMRA International is First of its Kind to Provide Actual Sales Information at Small Geographic Areas," claritas.com, Feb. 9, 2006, 3 pages, http.
"Claritas Introduces Prizm Ne Consumer Electronic Monitor Profiles: New Information Product Provides Insight Into the Public's Purchasing Behaviors of Consumer Electronics," claritas.com May 30, 2006, 3 pages.
"Information Resources, Inc. and Navic Networks Form Joint Relationship to Support Next Generation of Technology for Advertising Testing, IRI Expands BehaviorScan® Solution to Meet Digital and On-demand Needs," infores.com, Feb. 27, 2006, 2 pages, http://us.infores.com/page/news/pr/pr_archive?mode=single<_id=117.
"Mediamark Research Inc. Releases Findings From Mobile Marketing Consumer Study; Outback Steakhouse and Royal Caribbean Cruise Lines Among Brands Participating in Mobile Marketing Research," thefreelibrary.com, May 9, 2006, 4 pages, http://thefreelibrary.com.
"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=14532&trv=1.
"SRC Delivers Industry's First Drive Time Engine Developed to Follow Actual Road Networks," thomasnet.com, May 21, 2006, 4 pages, http://news.thomasnet.com/companystory/485722.
"VOD Integration Now Available in Strata: Buyers / Sellers Benefit from VOD Component on Popular Platform," stratag.com, Feb. 21, 2006, 1 page, http://www.stratag.com/news/mediapress022106.html.
Adweek, "Aim High: Ad Targeting Moves to the Next Level," dated Jan. 21, 2008 as downloaded from http://www.adweek.com/aw/magazine/article_display.isp?vnu on Apr. 16, 2008.
Adzilla, Press Release, "Zillacasting technology approved and patent pending," dated May 16, 2005 as downloaded from http://www.adzilla.com/newsroom/pdf/patent_051605.pdf on May 28, 2008.
AFX New Limited—AFX International Focus, "Nielsen moving to measure off-TV viewing," Jun. 14, 2006, 1 page.
Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
Card Marketing, Use the Latest CRM Tools and Techniques, www.CardForum.com, vol. 5 No. 10, Dec. 2001.
Click Z, "ISPs Collect User Data for Behavioral Ad Targeting," dated Jan. 3, 2008 as downloaded from http://www.clickz.com/showPage.html?page=clickz on Apr. 16, 2008.
cnet news.com, "Target me with your ads, please," dated Dec. 5, 2007 as downloaded from http://www.news.com/2102-1024_3-6221241.html?tag+st.util.print on Mar. 18, 2008.
Cowie, Norman E., Warning Bells & "The Bust-Out", Business Credit, Jul. 1, 2000.
Creamer, Matthew, "Consulting in marketing; Accenture, others playing role in firms' processes," Crain's Chicago Business, Jun. 12, 2006, 2 pages, Crain Communications.
Delany, Kevin J., et al. "Firm Mines Offline Data to Target Online Ads," Commercial Alert Oct. 17, 2007; as downloaded from http://www.commercialalert.org on Apr. 22, 2008.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
Dominique Haughton et al., "Direct Marketing Modeling with CART and CHAID", Journal of Direct Marketing, vol. 11, No. 4, Fall 1997.
Dymi, Amilda, Need for Leads Spurs Some Upgrades, Copyright 2008, Source Media Inc. p. 24 vol. 17 No. 8, May 2008.
eFunds Corporation, Data & Decisioning, Debit Report, http://www.efunds.com/web/industry-solutions/financial-services/fr . . . (Publication date unknown, Copyright date is 2005) **.
Fair Isaac Introduces Falcon One System to Combat Fraud, Business Wire, May 5, 2005.
Fair Isaac Offers New Fraud Tool, National Mortgage News & Source Media, Inc., Jun. 13, 2005.
Front Porch Brochure, "Ad Networks—Partner with Front Porch!: Our Internet-Wide Behavioral Targeting Brings Ad Networks Higher Revenue", 2 pages (Publication date unknown, Copyright date is 2008).
Front Porch Brochure, "New Free Revenue for Broadband ISPs!: Get your share of the $20 billion online advertising market!", 2 pages (Publication date unknown, Copyright date is 2008).
Fusun Gonul et al., "Optimal Mailing of Catalogs: A New Methodology Using Estimable Structural Dynamic Programming Models", 14 pages, Management Science, vol. 44, No. 9, Sep. 1998.
Gabriel Bitran et al., "Mailing Decisions in Catalog Sales Industry", Management Science, vol. 42, No. 9, Sep. 1996, pp. 1364-1381.
Halliday, Jean, "Ford recruits Accenture for marketing plan," Automotive News Feb. 13, 2006, 2 pages, Crain Communications.
Helm, Burt, "Nielsen's New Ratings Yardstick," businessweek.com, Jun. 20, 2006, 3 pages, http://www.businessweek.com/technology/content/jun2006/tc20060620_054223.htm.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
International Preliminary Report on Patentability and Written Opinion, PCT/US2008/064594, dated Oct. 8, 2008.
International Search Report and Written Opinion for PCT/US 08/83939, filed on Nov. 18, 2008, in 12 pages.
International Search Report and Written Opinion for PCT/US2007/63822, Sep. 11, 2007.
International Search Report and Written Opinion for PCT/US2007/63823, Oct. 24, 2007.
International Search Report and Written Opinion for PCT/US2007/63824, Oct. 9, 2007.
International Search Report and Written Opinion in PCT Application No. PCT/US2007/21815; Dated Sep. 5, 2008 in 11 pages.
International Search Report for PCT/US2007/06070, Nov. 10, 2008.
Jan Roelf Bult et al., "Optimal Selection for Direct Mail", Marketing Science, vol. 14, No. 4, 1995, pp. 378-394.
Katy Jacob et al., The Center for Financial Services Innovation, A Case Study of Checking Account Inquiries and Closures in Chicago, Nov. 2006.
Lars Muus et al., "A decision theoretic framework for profit maximization in direct marketing", 20 pages, Sep. 1996.
Main Page—Predictive Behavioral Targeting as downloaded from http://www.predictive-behavioral-targeting.com/index.php.Main_Page on Mar. 28, 2008.
NebuAD, Wall Street Journal Online, "Venture Capital: What's New", Oct. 22, 2007, 2 pages, http://www.nebuad.com/company/media_coverage/media_10_22_07.php.
Phorm, "The Open Internet Exchange", 2 pages, http://www.phorm.com/oix (Publication date unknown, Copyright date is 2008).
Phorm, Press Release Regarding Exclusive Agreements, 2 pages, Feb. 14, 2008, http://www.phorm.com/about/launch_agreement.php.
Pieter Otter et al., "Direct mail selection by joint modeling of the probability and quantity of response", 14 pages, Jun. 1997.
Rap Interactive, Inc. and Web Decisions, "LiveDecisions", 2 pages, Publication date unknown.
Tackling the Issue of Bust-Out Fraud, Retail Banker International, Jul. 24, 2007.

(56) References Cited

OTHER PUBLICATIONS

UPI, "Nielsen Media Research goes electronic," Jun. 14, 2006, 1 page.
Whitney, Daisy, "Atlas Positioning to Shoulder VOD Ads; Campaign Management Tools Optimize Inventory," TelevisionWeek, May 23, 2005, 3 pages.
U.S. Appl. No. 12/220,320, filed Jul. 23, 2008, Olof et al.
U.S. Appl. No. 12/705,489, filed Feb. 12, 2010, Bargoli et al.
U.S. Appl. No. 12/705,511, filed Feb. 12, 2010, Bargoli et al.
Allen Jost, Neural Networks, Credit World, Mar./Apr. 1993, vol. 81, Issue 4, pp. 26-33.
Andrew Reinbach, MCIF aids banks in CRA compliance, Bank Systems & Technology, vol. 32, No. 8, pp. 27, Aug. 1995.
GR Bitran, SV Mondschein—Management Science, 1996—JSTOR Mailing Decisions in the Catalog Sales Industry, Gabriel R. Bitram, Susana V. Mondschein. Management Sciencem vol. 42, No. 9, 1364-81, Sep. 1996.
Hakan Polatoglu et al., European Journal of Operational Research, Theory and Methodology, Probability distributions of cost, revenue and profit over a warranty cycle, Dec. 1996.
Hakan Polatoglua and Izzet Sahinb, Probability distributions of cost, revenue and profit over a warranty cycle, European Journal of Operational Research, vol. 108, Issue 1. Jul. 1, 1998, p. 170-83.
Haughton, Dominique et al., "Direct Marketing Modeling with CART and CHAID", Journal of Direct Marketing, vol. 11, No. 4, Fall 1997, p. 42-52.
Jeff Sweat, "Know Your Customers", Information Week, Nov. 30, 1998, pp. 20.
Muus, Lars et al., "A decision theoretic framework for profit maximization in direct marketing", 20 pages, Sep. 1996.
Otter, Pieter et al., "Direct mail selection by joint modeling of the probability and quantity of response", 14 pages, Jun. 1997.
Schmittlein, David C. et al., "Customer Base Analysis: An Industrial Purchase Process Application", Marketing Science, vol. 13, No. 1 (Winter 1994), p. 41-67.
Stein, Benchmarking Default Prediction Models: Pitfalls and Remedies in Model Validation, Moody's KMV, Revised Jun. 13, 2002, Technical Report #020305; New York.
"Intelligent Miner Applications Guide"; Chapters 4-7; pp. 33-132; IBM Corp., 1999.
Caliendo, et al.; "Some Practical Guidance for the Implementation of Propensity Score Matching"; IZA: Discussion Paper Series; No. 1588; Germany; May 2005.
Egol, Len; "What's New in Database Marketing Software," Direct, Aug. 1994, vol. 6, No. 8, p. 39.
Lamons, Bob, Be Smart: Offer Inquiry Qualification Services, Marketing News, vol. 29, Issue 23, Pages ABI/Inform Global, p. 13, Nov. 6, 1995.
Tao, Lixin; "Shifting Paradigms with the Application Service Provider Model"; Concordia University, Canada; IEEE; Oct. 2001.
Thoemmes, Felix; "Propensity Score Matching in SPSS"; Center for Educational Science and Psychology, University of Tübingen; Jan. 2012.

* cited by examiner

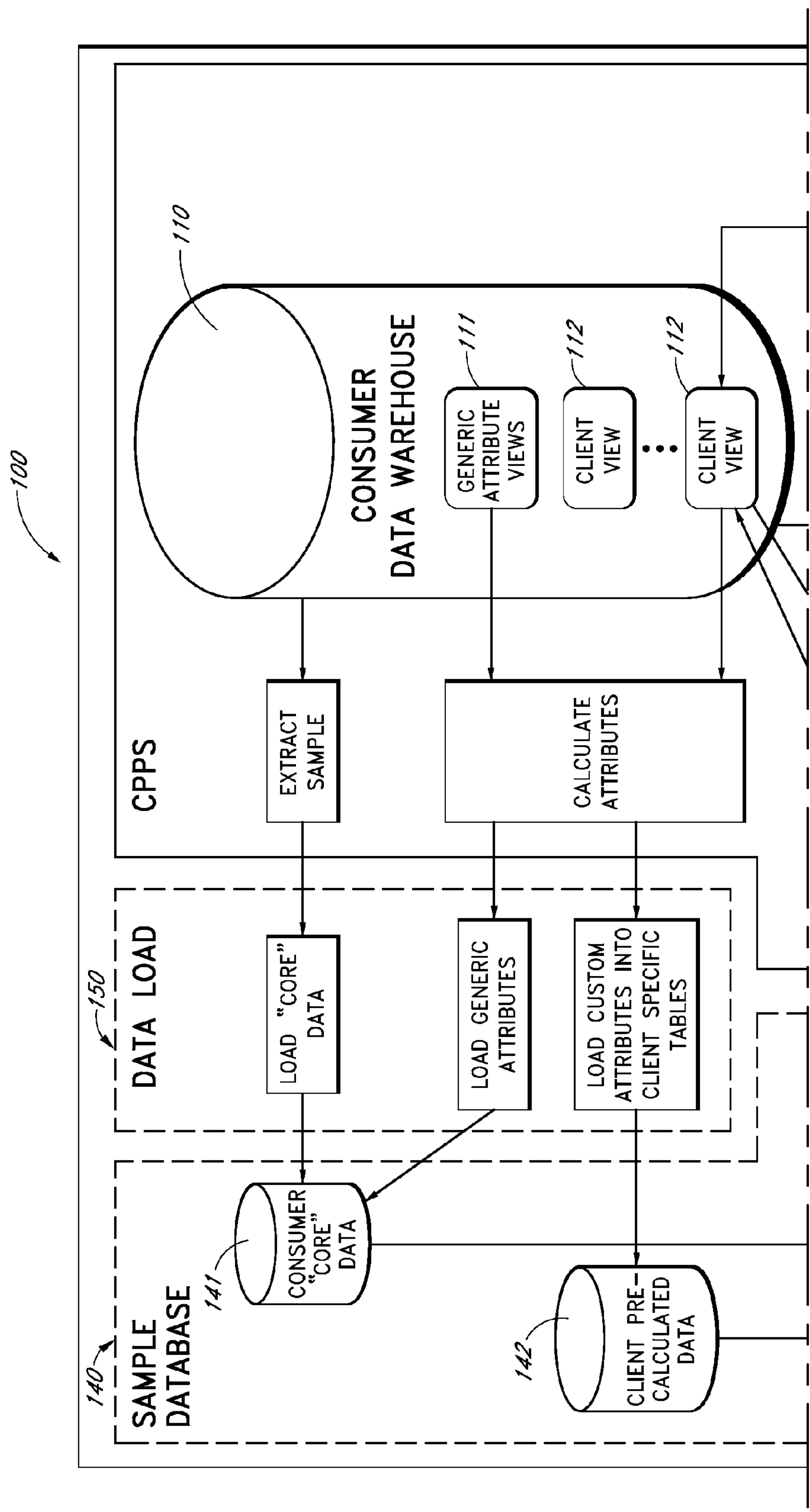
FIG. 1B1

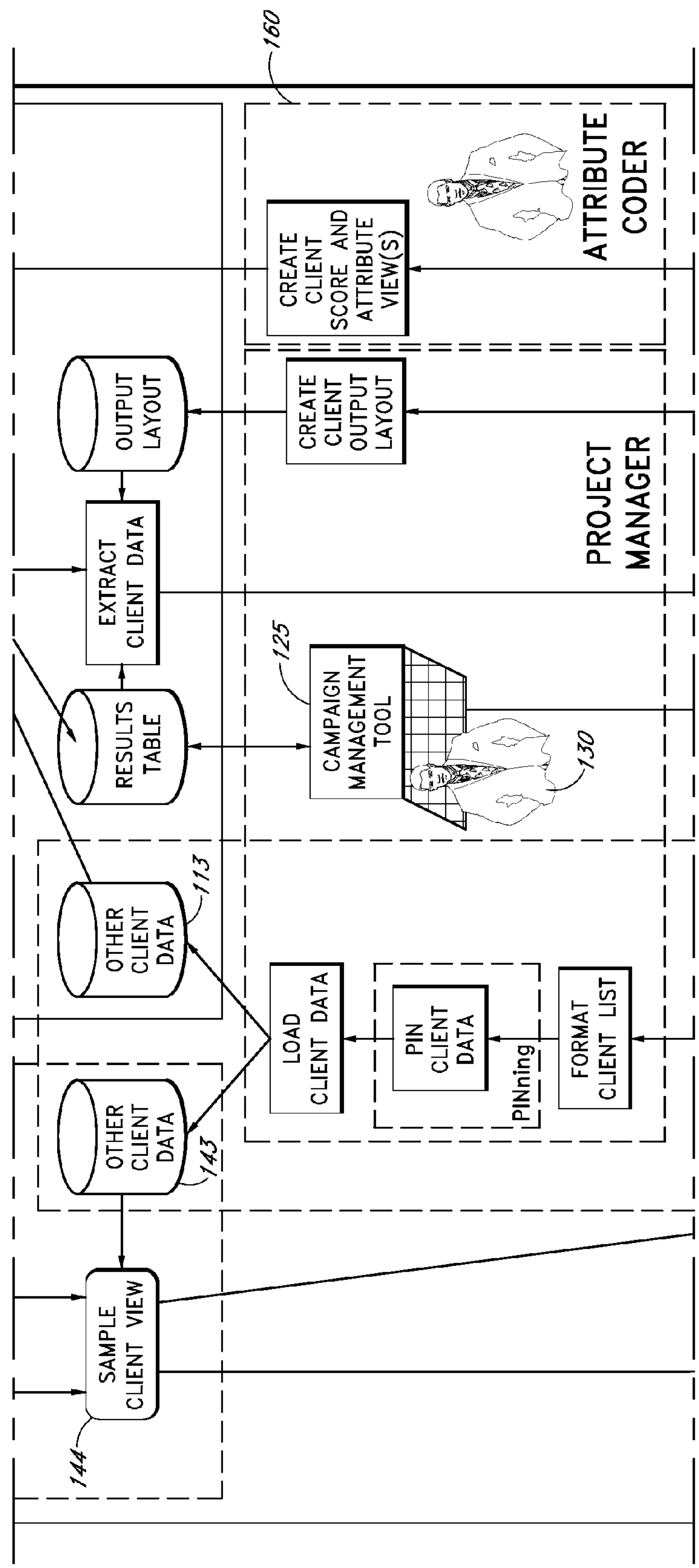
FIG. 1B2

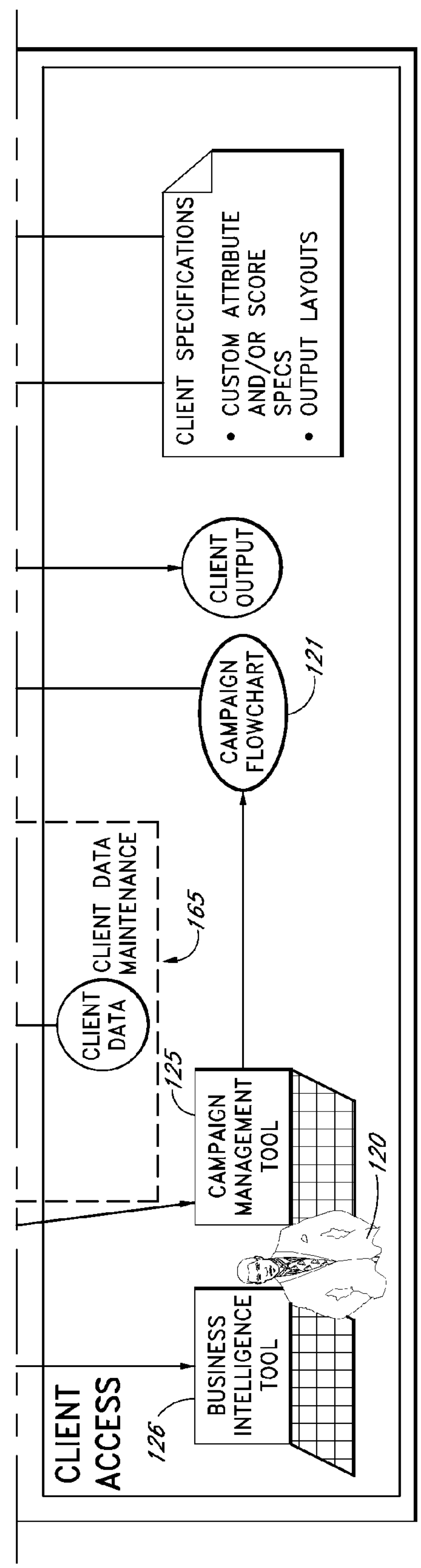
*FIG. 1B₃*

SYSTEMS AND METHODS FOR PROVIDING A DIRECT MARKETING CAMPAIGN PLANNING ENVIRONMENT

PRIORITY CLAIM

This application claims priority to U.S. Provisional Application No. 60/887,521, filed Jan. 31, 2007, and entitled SYSTEMS AND METHODS FOR PROVIDING A DIRECT MARKETING CAMPAIGN PLANNING ENVIRONMENT, the entire contents of which are hereby incorporated by reference in their entirety herein and should be considered a part of this specification.

BACKGROUND OF THE INVENTION

1. Field of the Invention

The disclosure relates to database testing environments, and, in particular, to the creation of a sample consumer information database environment for the testing and refining of direct marketing campaigns based on credit-related and/or non-credit-related data.

2. Description of the Related Art

Various business entities, including credit providers, perform direct marketing campaigns aimed at selected consumers who are identified, at least in part, based on data available from credit bureaus. In order to improve the cost-effectiveness of such campaigns, careful planning of the selection criteria for identifying the consumers to be targeted is desired. Refinement of the selection criteria often takes place by testing a proposed set of criteria on the database of credit bureau consumer information, or on a subset of the database, and analyzing the resulting set of consumers identified using the criteria.

Typically, marketers are trying to identify consumers with a desired set of characteristics. Effective refinement of the selection criteria is dependent, at least in part, upon accuracy and stability of the test database set upon which the testing is run, especially since current legislation regarding the use of consumer credit data for advertising purposes requires in some cases that marketers commit to making a firm offer of credit to consumers who are contacted. In other types of direct marketing campaigns, rather than making a firm offer of credit, the marketers may issue an "invitation to apply" (known as an ITA). Planning and execution for ITA campaigns may be restricted by law from using credit-related data. Marketers for firm offers of credit, ITA's, and other direct marketing campaigns are very interested in maximizing the success of their direct marketing campaigns by careful selection of consumers to be contacted.

SUMMARY

Due to the importance of direct marketing campaigns, it would be beneficial to improve the manner in which business entities, or marketers working on their behalf, can test and refine their direct marketing campaigns. Embodiments of the present invention allow business entities, referred to for purposes of this disclosure as "clients," to directly access, without intervention of an intermediary, a "partial snapshot" of a very up-to-date credit bureau or other consumer database in order to test and refine direct marketing campaign selection criteria for campaigns that they intend to run on the full credit bureau database in order to identify targets for a direct marketing campaign. The snapshot preferably comprises data that has been very recently updated and provides for the inclusion of a client's proprietary data and attribute definitions.

Embodiments of the systems and methods described herein disclose a computer database environment in which selection of consumers to be targeted by a direct marketing campaign can be planned, tested, and refined on a subset of a credit database. The subset of the credit database provides data that is both up-to-date and stable. In some embodiments, once refined, the selection of consumers to target for the direct marketing campaign may be carried out on the full credit database, which is preferably updated approximately twice weekly. In one preferred embodiment, the data for the test database represents a random sampling of approximately 10% of a full credit bureau database, which may include both credit and/or non-credit data. In one preferred embodiment, the full credit database is updated approximately twice weekly, and the 10% snapshot is updated only approximately once weekly. In some embodiments, the snapshot is updated less frequently than the full credit database. This provides a stable test environment in which the client can rely on the ability to use one static set of data for at least one week while the client refines the campaign selection strategies. Thus, changes in performance of various test runs within a given week can be attributed with confidence to associated changes in underlying selection strategy. In other embodiments, the test database comprises a different percentage of the full credit bureau database. Furthermore, the test database may be updated at a different advantageous frequency, such as once every two weeks, once every three weeks, once a month, and/or the like.

An embodiment of a system for planning and executing a direct marketing campaign is described. The system includes: a database of consumer credit information comprising records with information about a plurality of consumers; a copy of a subset of the consumer credit information from the database; and a client testing interface that allows a plurality of clients to access the copy of the subset and to individually run one or more tests of prospect selection criteria using the copy of the subset in order to identify a desired set of prospect selection criteria. The system further comprises a campaign interface that is configured to extract consumer information from the database, based, at least in part, on the desired set of prospect selection criteria for use by at least one of the plurality of clients in a direct marketing campaign.

Other embodiments of the system are described which include at least one of the following characteristics: the database of consumer credit information is updated twice weekly; the subset of the consumer credit information from the database comprises information from 10% of the consumer records in the database; and/or the copy of the subset of the database is updated weekly. In one embodiment of the system, the client testing interface further allows a client to use proprietary data that the client owns and that is associated with the subset of consumer credit information in running the one or more tests of the prospect selection criteria.

Embodiments of method are described for generating and maintaining a test environment for identifying desired prospect selection criteria for a direct marketing campaign. The method includes: identifying a sampling of records from a consumer credit data warehouse; calculating a set of generic attributes associated with the records included in the sample; cleansing the set of generic attributes of unwanted attributes; and loading the cleansed set of generic attributes into a test environment. The method further includes, for each of a plurality of clients: calculating, cleansing, and loading into the test environment client-proprietary attributes and client-proprietary data provided by the client that is associated with the records in the sample; and providing the client with access to the generic attributes and to the client-proprietary attributes and data provided by the client in the test environment. The method further includes determining when a lifespan associated with the test environment is completed, and, when the lifespan associated with the test environment is completed, rebuilding the test environment, based at least in part on a new sampling of records from the consumer credit data warehouse.

Embodiments of a method are described for using a sample database environment to test and use selection criteria for a direct marketing campaign on behalf of a client. The method includes: generating a sample database with a specified lifespan from a database of consumer information about a population of consumers, such that the sample database includes data from a portion of a set of consumer records in the database of consumer information; accepting from a client a proposed set of selection criteria for testing; running a test campaign on the sample database using the proposed set of selection criteria; and providing the test campaign results to the client for analysis. The method further includes: repeating the accepting, the running, and the providing with a modified proposed set of selection criteria received from the client until the client indicates it is satisfied with a set of selection criteria or until the lifespan of the sample database is complete; and using the set of selection criteria that satisfies the client to identify a subset of consumers from the database of consumer information for use in a direct marketing campaign.

Embodiments of a computer-readable medium are described, such that the computer-readable medium has stored thereon executable instructions that, when executed by a processor, cause the processor to perform a method for testing and executing a direct marketing campaign. The method includes: generating a sample database from a database of credit information about a population of consumers; accepting from a client a proposed set of selection criteria for testing; running a test campaign on the sample database using the proposed set of selection criteria; and providing the test campaign results to the client for analysis. The method also includes: repeating the accepting, the running, and the providing with a modified proposed set of selection criteria until the client indicates it is satisfied with a set of selection criteria; and using the set of selection criteria to identify a subset of consumers from database of credit information for use in a direct marketing campaign.

An embodiment of a system for testing a proposed direct marketing campaign is described. The system can include a client testing interface configured to access a sample database of depersonalized credit information including records with information about a plurality of consumers. The client testing interface can further be configured to individually run one or more tests of prospect selection criteria using the sample database.

In some embodiments, a system for testing and executing a direct marketing campaign is provided. The system can include a client testing interface configured to access a sample database of depersonalized credit information including records with information about a plurality of consumers. The client testing interface can further be configured to individually run one or more tests of prospect selection criteria using the sample database. The system can further include a campaign interface for use in executing a direct marketing campaign, configured to request that a set of selection criteria be used to identify information from a consumer data warehouse about a set of consumers.

In some embodiments, a system for testing, analyzing, refining, and executing a direct marketing campaign is provided. The system can include a consumer data warehouse database storing consumer population credit-related data including at least one generic attribute. The system can further include a client view including at least one proprietary attribute. The system can further include a sample database of consumer population credit-related data, including a database of core consumer data and a database of client pre-calculated data. The database of core consumer data can include a portion of the consumer data warehouse database. The system can further include an other client data database storing information from past direct marketing campaigns, including at least one response from a consumer to a past direct marketing campaign. The system can further include an extraction and data load module configured to load the at least one generic attribute into the database of core consumer data and the at least one proprietary attribute into the database of client pre-calculated data.

In some embodiments, a method for building a sample database is provided. The method can include receiving and storing in a first database a selection of proprietary attributes from a client. The method can further include receiving and storing in a second database consumer information from past direct marketing campaigns. The method can further include sampling a third database of depersonalized consumer credit information, including records with information about a plurality of consumers. The method can further include extracting and loading a subset of depersonalized credit information from the third database into a fourth database, including copying a subset of the consumer credit information in the third database to the fourth database. The method can further include extracting and loading the first database into the fourth database including copying the proprietary attributes from the first database to the fourth database. The method can further include associating the second database with the fourth database.

In some embodiments, a method for testing, analyzing, refining, and executing a direct marketing campaign is provided. The method can include storing consumer population credit-related data, including at least one generic attribute in a consumer data warehouse database. The method can further include generating a sample database including a portion of the consumer population credit-related data in the consumer data warehouse database. The method can further include receiving a first request from a client to access the sample database to run one or more tests of prospect selection criteria using the sample database. The method can further include receiving a second request including actual selection criteria from a client to execute a direct marketing campaign. The method can further include in response to receiving the second request, accessing the consumer data warehouse database and segmenting a consumer population based on the actual selection criteria.

The disclosure provided in the following pages describe examples of some embodiments of the invention. The designs, figures, and description are non-limiting examples of some embodiments of the invention. Other embodiments of the campaign planning environment may or may not include the features disclosed herein. Moreover, disclosed advantages and benefits may apply to only some embodiments of the invention, and should not be used to limit the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 1B is a block diagram that shows how FIGS. 1$B_1$, 1$B_2$, and 1$B_3$ can be combined to form a single high level block diagram depicting one embodiment of a system for planning and executing a direct marketing campaign.

FIGS. 1$B_1$, 1$B_2$, and 1$B_3$ are high level block diagrams depicting embodiments of the campaign planning and executing system 100 that improves campaign testing and refining capabilities.

DETAILED DESCRIPTION

Figure 1A:
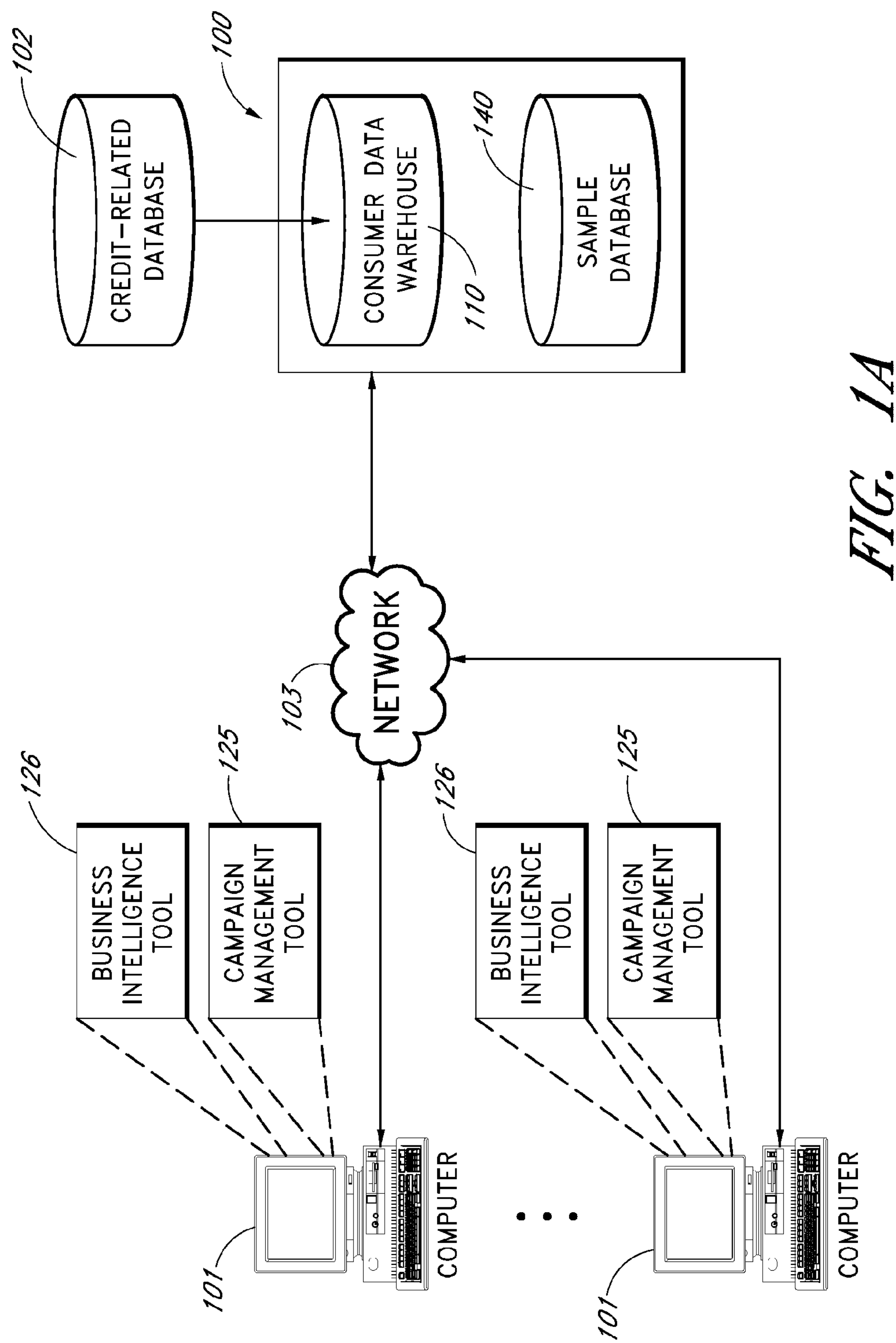
FIG. 1A illustrates one embodiment of a system for planning and executing a direct marketing campaign, including typical client components for accessing the system.

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

I. Overview

The present disclosure relates to test environment for planning strategies for direct marketing campaigns. As used herein, a "strategy" refers to a set of selection criteria, also known as selection rules that may be used to form a query for execution on a database of records regarding prospective recipients of a direct marketing offer. The strategy may thus identify one or more attributes associated with the records that may be combined, often in a very complex query, to identify a desired subset of the records in the database.

One example of a database that may be suitable for identifying prospective recipients of a direct marketing offer can be one or more databases of consumer information available from a credit bureau. Such credit bureau databases may comprise both credit-related and non-credit related data, such as demographic data, data from public records, and the like. In addition to credit bureaus, other business entities may provide access to suitable databases of consumer information, that may comprise credit-related and/or non-credit related data.

One example of a direct marketing campaign offer is a firm offer of credit, for which campaign offer recipients may be identified using both credit-related and non-credit related data about consumers. Another example of a direct marketing campaign offer is an offer that is not a firm offer of credit, known as an "Invitation to Apply" (ITA) offer, which may be based on non-credit-related data alone. The systems and methods described herein are contemplated as also being useful for identifying recipients of other types of direct marketing offers that may be based on any of a variety of other types of data. Although, for ease of description, the systems and methods disclosed herein are frequently described as being performed on a credit bureau database and as providing a database environment in which clients can use credit-related data for planning direct marketing campaigns, it is to be understood that, in various embodiments, the campaigns may be planned using either credit-related data, non-credit-related data, or both. Furthermore, the environment may be provided by a credit bureau or other entity providing access to consumer data.

Previous test environments for planning direct marketing campaigns using credit bureau data frequently included a full custom-built copy, known as a "full snapshot" or "100% snapshot," of the credit database from which consumer names for the final direct marketing campaign are selected. Tasks performed in the 100% snapshot may include some or all of: analysis and campaign development, campaign set-up, audit and reporting on campaign logic, receiving client approval to proceed, and execution of the full direct marketing campaign. Since a credit bureau database may include records for hundreds of millions of consumers, building such a full copy of the database typically involves a significant lag time between initiation of the database snapshot building process and availability of the snapshot of use in testing. Thus, freshness of the data used may be compromised by the time testing begins. This lack of data freshness may be exacerbated when the data in the source database is itself lacking in freshness, due, for example, to infrequent updates.

The lack of data freshness is yet further exacerbated when a direct marketing campaign developer, desiring to test and refine campaign strategies, must submit every new refinement of the campaign selection criteria to a credit bureau representative for running on the credit bureau database and must wait for a credit bureau representative to report on the results. The interjection of a third party into a campaign developer's refinement of a campaign strategy frequently makes the process inordinately cumbersome and time-consuming.

Furthermore, lenders frequently desire to include proprietary data of their own and proprietary attribute definitions for use with the credit bureau data in campaign testing, refining, and finally, execution. The desire to include multiple data sources, including proprietary data for those who can afford the investment, frequently leads to building a proprietary test database for the lender's private use. A proprietary database or snapshot is not only an extremely expensive and time-consuming proposition, both to build initially and to update, but also typically yields a database with data that is out-of-date by the time the database is used for testing and finally executing the campaign strategy.

On the other hand, using a snapshot of a database that is updated very frequently and that cannot be used and stored for re-use during the development of a campaign lessens a campaign developer's confidence that differences in campaign test results obtained from various test runs are the result of changes in the campaign's selection strategies and are not simply, in part or in total, the result of changes between the various snapshots.

Systems and methods are disclosed herein for providing a direct marketing campaign planning environment, such as for marketing campaigns directed to consumers identified using a credit-related database system. Frequently, business entities carrying out a direct marketing campaign first identify a desired set of recipients for one or more marketing offers associated with the campaign, and contact the identified recipients, such as via mail, telephone, email, or the like, with the marketing offer.

For purposes of the present disclosure, a "testing" phase is described in which the business entities may repeatedly test and refine a set of selection criteria for identifying consumers expected to be good prospects for a marketing campaign using a sample database that is a copy of a portion of a large database of consumer records. Once a satisfactory set of selection criteria is obtained, an "execution" phase includes using the selection criteria on the large database of consumer records to identify consumers to be recipients of the direct marketing offer. In some embodiments, contact information for the identified consumers may also be provided. In some embodiments, execution may further comprise using the contact information to contact the identified consumers with the direct marketing offer, and may further include tracking consumer response to the direct marketing campaign.

II. Architecture

FIG. 1A illustrates one embodiment of a system for planning and executing a direct marketing campaign. As depicted in FIG. 1A, the system 100 may comprise a consumer data warehouse 110, which is communication with a credit-related database 102, and a sample database 140. In preferred embodiments, the system 100 comprises one or more server systems (typically comprising multiple physical computers/machines) and associated content that are accessible to a plurality of client computing devices 101 via a network 103. The system 100 can be implemented using physical computer servers that are geographically co-located or that are geographically remote from one another. The system 100 may in some embodiments, include content that spans one or multiple internet domains.

The credit-related database 102 may be configured to receive, update, and store vast amounts of data. For example, in one embodiment, a credit bureau uses the credit-related database 102 for storing data received from a variety of sources for approximately three hundred million consumers. Such data may include, for example, demographic information, credit-related information, and information available from public records. Some or all of the data may be used, among other purposes, to calculate credit scores for the consumers.

The consumer data warehouse 110 may be configured to store a copy or near-copy of the data in the credit-related database 102. In various embodiments, a copy of data from the credit-related database 102 is periodically extracted and reconfigured for updating the consumer data warehouse 110. For example, data from the credit-related database 102 may be processed by a set of ETL (Extract, Transform Load) servers before being transmitted to the consumer data warehouse 110.

After the data has been transformed by the ETL servers, the data may be loaded to the consumer data warehouse 110, such as by way of a high speed server interconnect switch that handles incoming and outgoing communications with the consumer data warehouse 110. As one example, the high speed interconnect switch may be an IBM SP2 switch. In other embodiments, Gig Ethernet, Infiniband, and other high speed interconnects may be used.

Embodiments of an architecture for the consumer data warehouse 110 may be implemented using a Massively Parallel Processing (MPP) hardware infrastructure. In one embodiment, IBM AIX pSeries servers (8-way p655) may act as the MPP building blocks of the consumer data warehouse 110. In other embodiments, other types of servers may act as the MPP building blocks of the system, for example, Linux servers, other types of UNIX servers, and/or Windows Servers. A similar architecture could also be implemented using Symmetric Multi-Processing (SMP) servers, such as IBM P690 32-way server or HP Superdome servers.

In preferred embodiments, a relational database management system (RDBMS), such as a DB2 EEE8.1 system, manages the data in the consumer data warehouse 110.

The system 100 can also include a sample database 140 that stores a temporary copy of a portion of the data in the consumer data warehouse 110, as will be described in greater detail below. The sample database 140 can serve as an environment in which one or more clients may test, refine, and/or validate a proposed marketing campaign before executing the campaign on the full consumer data warehouse 110.

FIG. 1A further illustrates typical client components for accessing the system, in accordance with some embodiments of the invention. As depicted in this drawing, one or more clients can use a general purpose computer or computing device 101 with access to a network 103 to access the system 100.

For example, one or more of the computing devices 101 may be a personal computer that is IBM, Macintosh, or Linux/Unix compatible. In one embodiment, the client computing device 101 includes a central processing unit (CPU), which may include a conventional microprocessor. The computing device 101 further includes a memory, such as random access memory (RAM) for temporary storage of information and a read only memory (ROM) for permanent storage of information, and a mass storage device, such as a hard drive, diskette, or optical media storage device.

The client computing device 101 may include one or more commonly available input/output (I/O) devices and interfaces, such as a keyboard, mouse, touchpad, and printer. In one embodiment, the I/O devices and interfaces include one or more display device, such as a monitor, that allows the visual presentation of data to a user. More particularly, a display device provides for the presentation of GUIs, application software data, and multimedia presentations, for example. The client computing device 101 may also include one or more multimedia devices, such as speakers, video cards, graphics accelerators, and microphones, for example.

The network 103 may comprise one or more of a LAN, WAN, or the Internet, for example, via a wired, wireless, or combination of wired and wireless, communication link that may be configured to be secured or unsecured.

As further illustrated in FIG. 1A, the computer 101 of the client can run a campaign management tool 125 and business intelligence tool 126. The campaign management tool 125 and business intelligence tool 126 can be configured to perform research and analysis functions associated with testing and refining the proposed direct marketing campaign.

Although the credit-related database 102 and the client computing devices 101 have been depicted in FIG. 1A as being external to the system 100, in other embodiments, one or more of the credit-related database 102 and/or the client computing devices 101 may be provided as part of the system 100, in which cases, communications may take place using one or more internal communications systems. Additionally or alternatively, rather than being a copy of the credit-related database 102, the consumer data warehouse 110 may receive update data, including, but not limited to demographic information, credit-related information, and/or information available from public records, directly from other sources.

In some embodiments, clients 120 may access the consumer data warehouse 110 and/or may run campaigns directly rather than via the project manager 130.

Figure 1B:
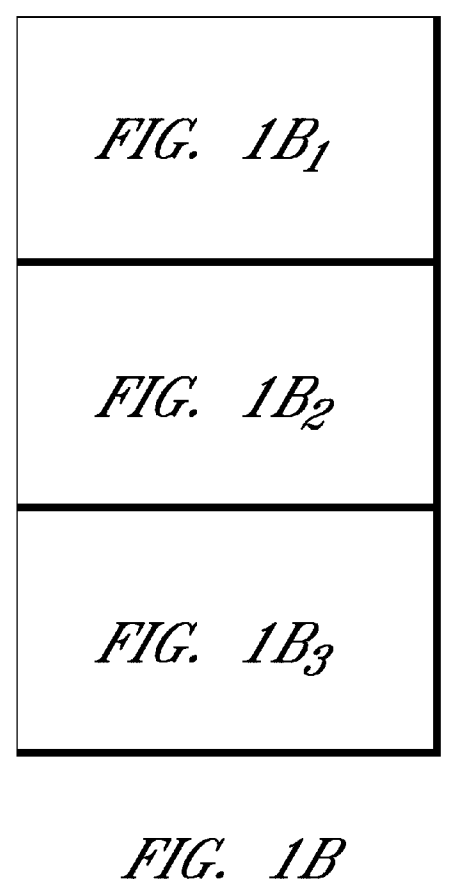

FIGS. $1B_1$, $1B_2$, and $1B_3$ are high level block diagrams depicting embodiments of a campaign testing and executing system 100 that improve campaign testing and refining capabilities. FIG. 1B shows how FIGS. $1B_1$, $1B_2$, and $1B_3$ can be combined to form a single high level block diagram depicting one embodiment of the campaign testing and executing system 100. The campaign testing and executing system 100 may be used, at least in part, by lenders, other providers of credit services or other business entities, and/or marketers working on their behalf (referred to, for purposes of this disclosure, as "clients" 120) who wish to use data available from one or more credit bureaus or other provider of consumer data to help identify consumers who may be interested in the services of the clients.

In various embodiments, the campaign testing and executing system 100 may be implemented using a variety of computer hardware and software resources. For example, computer servers, such as web servers, database servers, campaign management tool servers, and business intelligence tool servers, as well as direct access storage device (DASD) capacity accessible by one or more of the above-described types of servers are used in various embodiments. Furthermore, associated software, such as cluster multi-processing software, campaign management software, business intelligence software, network communications software, and database management software (such as DB2, Oracle, or Sybase, for example) can also be used.

In the embodiments depicted in FIGS. $1B_1$, $1B_2$, and $1B_3$, a consumer data warehouse 110 includes data about millions of consumers. In particular, data in the consumer data warehouse 110 may be a copy or near-copy of data from the database of credit-related data 102, which is used for calculating consumer credit ratings, among other uses, and which is updated daily or more frequently. The data in the consumer data warehouse 110 may be organized so as to make batch processing of the data more expedient and may be updated from the database of credit-related data 102 that is used for calculating consumer credit ratings on a regular, preferably frequent, basis, so that data in the consumer data warehouse 110 includes up-to-date changes in the consumers' records. In a preferred embodiment, the consumer data warehouse 110 is updated twice weekly.

In the consumer data warehouse 110, the data may be organized generally as records of data for each consumer. Each record may be divided conceptually into attributes associated with each consumer. Examples of demographic, credit, or custom attributes that may be useful to clients 120 wishing to identify potential customers may include, but are not limited to: number of credit cards held by the consumer, total available credit, total current balance, number of late payments within the last year, number of late payments within the last three years, no tradelines, and the like. In addition, some attributed may be derived from other attributes, such as but not limited to derived attributes that are aggregations of other attributes or that are calculated from other attributes. In many embodiments, the consumer data warehouse 110 may include hundreds of attributes for each consumer. Some attributes, and especially attributes useful to a wide variety of clients using the system 100, may be pre-calculated for the consumer records and may be generally available to the clients as a generic attribute view 111 from the consumer data warehouse 110. Clients 120 may also wish to define custom attributes for their own use to help identify consumers of interest. Instructions for calculating these proprietary attributes may be input to the consumer data warehouse 110 by a custom attribute coder 160 on behalf of individual clients 120 for use by the individual clients. The custom attributes may be stored in a plurality of client views 112, which allow each client 120 to access only their own proprietary attributes.

In some embodiments, in addition to the attributes in views 111, 112, clients may provide other data 113 that may be used together with the data in the consumer data warehouse 110 to identify potentially good prospects for a direct marketing campaign. For example, clients 120 may wish to include historical information identifying consumers who have previously been contacted in one or more direct marketing campaigns, response history information about consumers who have been contacted, information identifying consumers who have requested not to be contacted, and/or the like. Other non-campaign related data may also be included with the other data 113.

Generally, when a client 120 wishes to run a direct marketing campaign, a campaign flowchart 121 is generated to describe a plan for identifying desired consumers from the records in the consumer data warehouse 110. The campaign flowchart 121 is typically a complex plan for using a large number of attributes from the generic attribute view 111 and the client view 112, along with other client data 113, to categorize the consumers and to select consumers whose attributes place them in one or more desired categories. The campaign flowchart 121 is provided to a project manager 130 who, among other tasks, accepts the campaign flowchart 121 for extracting the desired information, often in the form of consumer names and contact information, from the consumer data warehouse 110.

In order to help the client 120 design a campaign flowchart 121 that successfully identifies consumers appropriate for a given direct marketing campaign, the campaign testing and executing system 100 advantageously includes a sample database 140 that serves as a temporarily available environment in which a client may test, refine, and validate a proposed campaign flowchart 121. The sample database 140 preferably includes data from a random or semi-random sampling of the records in the consumer data warehouse 110 so that results obtained from test campaigns run on the sample database 140 will be statistically meaningful indicators of the results that would be obtained using the full consumer data warehouse 110. It is desirable for the sample database 140 to include a sufficiently large sampling of the consumer data warehouse 110 records to provide a statistically meaningful sample while being sufficiently small to allow for quick building of the database 140 and quick execution of test campaigns. Preferably, the sample database 140 includes fewer records than the consumer data warehouse 110. In one embodiment, a sample size of 10% of the full consumer data warehouse 110 is preferred. That is, the sample database includes at least a portion of the data from 10% of the consumer records in the full consumer data warehouse 110. In other embodiments, other preferred sizes may be used, including 1% to 70%, or 5% to 25% of the records in the credit-related database 102. Although embodiments of the systems and methods are described herein with reference to a 10% sample database 140, embodiments of the systems and methods are also contemplated as being used with a sample database 140 that represent a different portion of the full consumer data warehouse 110.

As depicted in FIGS. $1B_1$, $1B_2$, and $1B_3$, once a sample (for example, 10% of the data warehouse records) is selected, generic attributes from the generic view 111 and proprietary attributes in the client view 112 that are associated with consumers in the sample go through an extraction and data load process executed by a data load module 150 to build the sample database 140. Generic attributes may be stored in a repository of consumer core data 141 and proprietary attributes from the client view 112 may be stored in a repository of client pre-calculated data 142. In various embodiments, certain portions of the selected records the consumer data warehouse 110 may be omitted from records in the sample database 140. For example, consumer name and contact information may be deleted from the records to be used for campaign testing in order to comply with various governmental regulations regarding proper use of consumer credit information. Instead, anonymous identifier numbers and general location information may be used to identify the individual records and to allow a geographically representative sample to be selected. As will be familiar to a practitioner of skill in the art, other methods of anonymizing consumer records while retaining their usefulness for campaign development may also be used.

As depicted in FIGS. $1B_1$, $1B_2$, and $1B_3$, a copy of some or all of the other client data 113 may be stored in a repository of other client data 143 for use with the sample database 140.

In one embodiment, to test, analyze, and refine a proposed campaign, the client 120 uses a campaign management tool 125 and/or a business intelligence tool 126 to access a sample client view 144 that includes data from the repository of sampled consumer core data 141, the associated repository of client pre-calculated data 142, and the repository of other client data 143. The campaign management tool 125 and the business intelligence tool 126 are software applications that may be accessed and run using a personal computer (PC) or any of a variety of other commonly available computing devices in order to send queries to the sample database 140, to generate reports based at least in part on information obtained from the sample database 140, and to perform other research and analysis functions associated with testing and refining the proposed direct marketing campaign. In preferred embodiments, the client 120 may access the campaign testing and executing system 100 by way of the Internet or other communications network 103.

In preferred embodiments, the campaign management tool 125, or another aspect of the campaign testing and executing system 100, provides the client 120 with a "layman, user-friendly" data dictionary that describes elements available within the sample database 140. The client 120 is preferably also provided with a "look-up" capability for various available categories of attributes, for example mortgage-related attributes, credit-rating related attributes, or the like. In some embodiments, the client 120 may additionally or alternatively create and use proprietary attributes for use in the direct marketing campaign.

Preferably, the campaign management tool 125 allows the client 120 to be able to conduct high-level campaign development functions, such as segmentation of the consumer population, selection of one or more such segments, and/or suppression of one or more segments or one or more individual consumers from the selection results.

Furthermore, the campaign management tool 125 preferably provides the client 120 with a capability to construct queries for testing and executing the campaign through a graphic user interface (GUI). The campaign query interface allows for basic and advanced logic to be defined and used to construct queries in one or more database query languages, such as Standard Query Language (SQL). In a preferred embodiment, the query interface provides the client 120 with a capability to create SQL queries directly, to view either or both of SQL queries created directly by the user and/or queries generated via the query builder interface, and to edit either or both of SQL queries created directly by the user and/or queries generated via the query builder interface.

The query interface of the campaign management tool 125 preferably allows the client 120 to name query definitions, to save query definitions, to reuse query definitions. Additionally, in a preferred embodiment, the query interface provides the client 120 with an ability to record and modify campaign selection rules for future use. In some embodiments, the query interface allows the client 120 to share query definitions with one or more authorized users.

Furthermore, in a preferred embodiment, the query interface allows the client 120 to test a query, to view query results, and to print the query results. For each query result, the query interface may have the capability to provide a sample of the underlying data.

In one embodiment, the campaign management tool 125 includes a query interface that allows the client 120 to select individuals from the marketing database based upon individual or household criteria. The query interface allows the client 120 to add data sources for the purpose of selection for individual campaigns. The query interface further provides the client 120 with an ability to select records based on a "times mailed" calculation derived from the historical campaign response data. The query interface may provide the capability to identify customer segments. The query interface may additionally or alternatively provide the client 120 with a capability to utilize independent queries for each segment and segmentation trees to split the customer universe into subgroups.

In some embodiments, the same campaign management tool 125 and the business intelligence tool 126 software applications that are used for running direct marketing campaigns on the full consumer data warehouse 110 (the 100% environment) may also provide all functionality needed for allowing clients 120 to directly create and test campaigns on the sample database 140 (10% environment). In some embodiments, separate query interfaces for campaign testing and campaign execution may be provided. In some embodiments, the campaign management tool 125 and the business intelligence tool 126 software applications may provide some, but not all, preferred functionality for providing the systems and methods disclosed herein, in which case supplemental software may be added to or used in conjunction with the campaign management tool 125 and/or the business intelligence tool 126 software to provide the missing functionality.

The client 120 may run and re-run the test campaign on the sample database 40 as desired, performing champion/challenger tests, for example, and observing the effects of modifications on the campaign results. In various embodiments, the data in the sample database 140 remains temporarily static until the sample database 140 is re-built, using a new randomly selected sampling of the credit-related database 102 records which may take place at regular intervals, such as for example, once a week. Thus, the client 120 can have confidence that the various campaign test runs being run during a given week are being run on the same data. In other embodiments, the data in the sample database 140 may be updated according to another schedule, such daily, monthly, upon demand by one or more clients, at random intervals, or the like.

In various embodiments, the client 120 can run various types of reports using the campaign management tool 125 and/or the business intelligence tool 126 software in order to aid in analysis of the data and test results. For example, in one embodiment, the client 120 may run one or more campaign analysis reports that allow the client 120 to predict response to the direct marketing campaign within a segment or group of segments of the targeted population. The client 120 may also use reports to refine future marketing strategies. In some embodiments, the client 120 may specify a preferred output layout for the reports.

In some embodiments, the campaign management tool 125 and the business intelligence tool 126 software do not communicate directly with one another and do not directly share metadata or queries, although the client 120 may manually transfer queries, for example, from one to the other. In other embodiments, the campaign management tool 125 and the business intelligence tool 126 software may be configured to have access to shared metadata and queries.

Once the client 120 has had an opportunity to test and/or refine the campaign strategy and is satisfied with the campaign strategy, the client may provide the campaign flowchart 121, which reflects the desired campaign strategy, to the project manager 130 for running on the full data warehouse 110 environment as currently updated.

As was described above, in preferred embodiments, the consumer data warehouse 110 is updated twice weekly or at another advantageously frequent interval to insure "freshness" of the data. Thus, although the campaign testing may, in some embodiments, have been run on data that was about ten days old, the actual campaign may be run on data that is three days old or newer. In some embodiments, once the client 120 submits the desired campaign strategy in the form of a campaign flowchart 121 to the project manager 130, either directly or via an intermediary, the campaign may be run on the full consumer data warehouse 110 and results returned to the client 120 within as little as three business days or less. In other embodiments, results may be returned to the client 120 within another advantageously short period of time.

In preferred embodiments, the campaign management tool 125 and/or the business intelligence tool 126 may provide a variety of reporting services to the client 120. For example, the campaign management tool 125 may also provide the client 120 with data about consumer responses received in connection with one or more executed direct marketing campaigns. In other embodiments, the client 120 may receive consumer response reports from another source. In one embodiment, a response analysis report may provide an analysis of responses received from a direct marketing campaign executed through the system 100. The response analysis report may summarize results over periods of time with shorter comparison periods in the immediate weeks after a campaign is executed to longer time frames after the campaign has completed. The response analysis report may provide flexibility to perform analysis of various levels and/or categories of summarization, which may include, but are not limited to: customer segments, product line, product campaign, promotion, offer, collateral, media, and/or vendor.

In some embodiments, a client data maintenance service 165 provides the client 120 with an ability to store campaign-related data related to client campaigns. For example, the client data maintenance service 165 may make campaign data accessible for further campaign development purposes, for analysis purposes, and/or in order to update/delete/archive campaign data for client campaigns. The client data maintenance service 165 may provide the ability to receive and store campaign-related data for direct marketing campaigns that may be common to most or all of a client's campaigns and thus may be useful for future campaigns. The client data maintenance service 165 may collect data of individual promotions in order to derive a "times contacted" calculation for use in future campaign development.

In some embodiments, the client data maintenance service 165 may further record updates to identifying information, such as name, address, and/or telephone information received during a direct marketing campaign. The client data maintenance service 165 may record mail disposition updates for individual consumer records, such as whether a direct mailing advertisement was mailed or not mailed, along with associated explanatory reason codes. The client data maintenance service 165 may record telephone contact disposition updates for individual consumer records, such as whether a direct mailing advertisement call was made or not made, along with associated explanatory reason codes. In other embodiments, other types of data may additionally or alternatively be maintained on behalf of the client 120, by the client data maintenance service 165 and/or as part of the campaign management 125 or business intelligence tool 126 services.

In some embodiments the system 100 may be used for planning a variety of types of campaigns, including, for example, both firm offers of credit and ITA offers. In some embodiments, the system 100 may provide access for clients 120 to two or more sample databases 140, including at least one sample database that includes only non-credit related data. This type of non-credit related sample database may be used, for example, for planning campaigns where the use of consumer credit data is not permitted. In other embodiments, the sample database 140 may be configured to include a mix of credit and non-credit information, such that the system 100 may provide clients 120 with access to both the credit and the non-credit information or to only the non-credit information in the sample database 140.

The methods and processes described above and throughout the present disclosure may be embodied in, and fully automated via, software code modules executed by one or more general purpose computers/processors. The code modules may be stored in any type of computer-readable medium or other computer storage device. Some or all of the methods may alternatively be embodied in specialized computer hardware.

Figure 2:
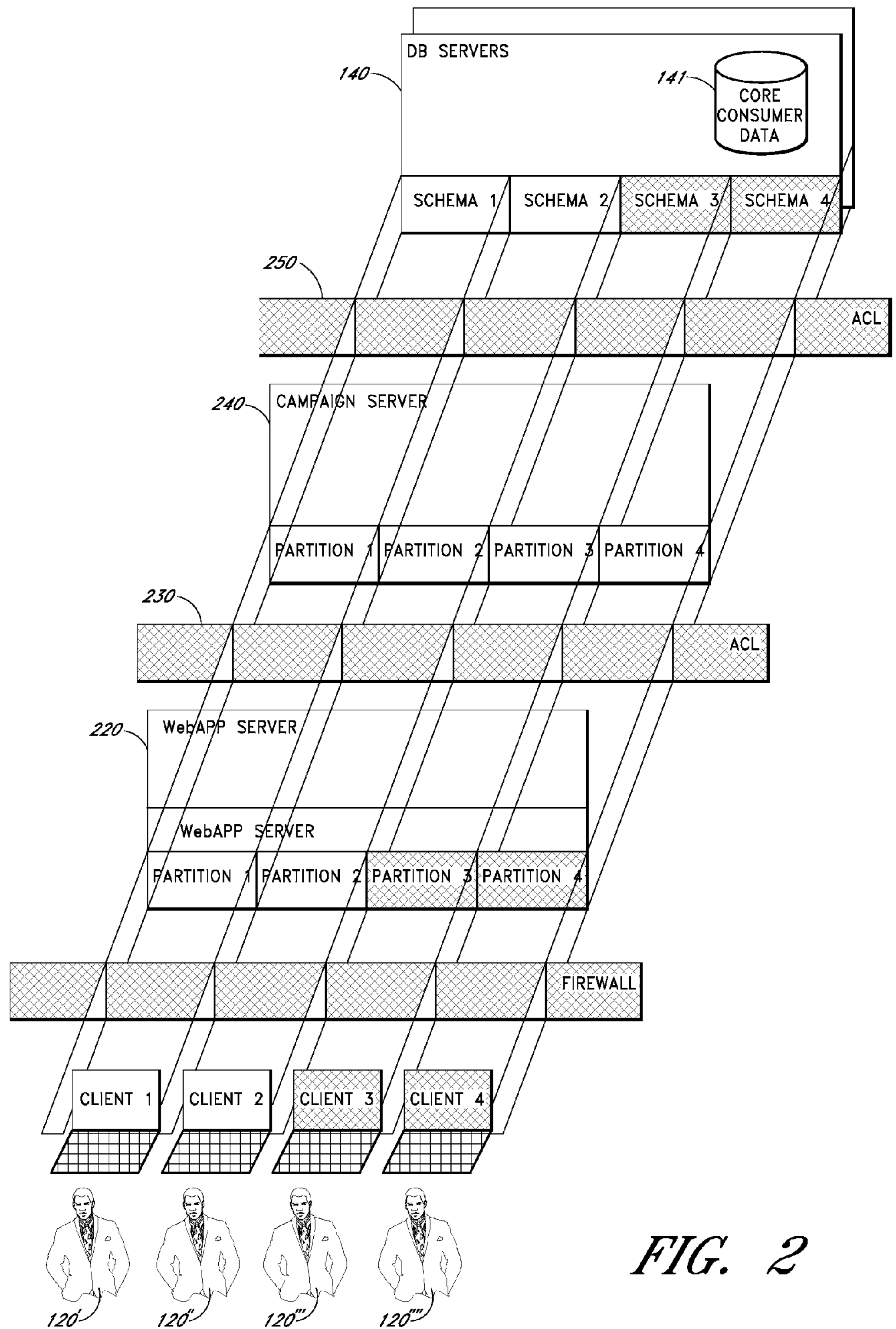
FIG. 2 depicts one embodiment of a partitioning solution that allows a plurality of individual clients to access the same sample database, without corrupting or having access to one another's data.

FIG. 2 depicts one embodiment of a partitioning solution that allows a plurality of individual clients 120', 120", 120'", 120"" to access the same sample database 140, without corrupting or having access to one another's proprietary data. As was depicted in FIGS. 1$B_1$, 1$B_2$, and 1$B_3$, the sample database 140 includes a repository of core consumer data 141, available to all clients, which includes data associated with a randomly selected portion, such as 10%, of the records in the full consumer data warehouse 110. In a preferred embodiment, once a week, a new 10% sample of the full consumer data warehouse 110 is randomly selected, extracted from the consumer data warehouse 110, cleansed of undesirable or unnecessary attributes, such as name, address, other contact information, and the like, and is loaded into the repository of core consumer data 141. In addition, pre-calculated attributes associated with the generic attribute view 111 for the selected portion of the consumer records can be calculated and loaded in to the repository of core consumer data 141 that is commonly available to clients using the sample database 140.

Furthermore, the system 100 may provide each client 120 accessing the sample database 140 with additional proprietary data owned by the client. The proprietary data may include custom attributes, as defined in the client view 112 of the consumer data warehouse 110 and/or may be custom attributes defined for the current campaign. The custom attributes can be calculated for the randomly selected portion of the consumer records and are loaded in the repository of client pre-calculated data 142 in the sample database 140. In addition, other client data 143, proprietary to each client, may be made available use for by the associated client. For example, client-specific campaign history data and/or client-specific response history data may be provided to clients 120 using the sample database 140. This test environment which persists for one week, or for another desired span of time, provides a stable environment that is very helpful to campaign developers.

As depicted in FIG. 2, the generic data available to all clients and the proprietary data exclusive to individual clients 120', 120'', 120''', 120'''' are depicted as Schema 1, Schema 2, Schema 3, and Schema 4. Each schema may, in various embodiments, include the client pre-calculated data 142 for the 10% or other sized sample and/or the other client data 143 that were described with reference to FIGS. $1B_1$, $1B_2$, and 1B3 and may be used with the data in the repository of core customer data 141.

FIG. 2 shows that each schema is accessible only to its respective client 120, and is shielded from access or use by other clients by a system of partition. The partition plan depicted in FIG. 2 allows a plurality of clients 120 to access the sample database 140 simultaneously or nearly simultaneously for testing and refining their respective campaign strategies. In one embodiment, the campaign testing and executing system 100 allows for from one up to one hundred clients 120 to access the same sample database 140, including the shared core consumer data 141 and each client's 120 proprietary data, simultaneously. Clients may pose up to one hundred queries per month and may extract from less than one up to over thirty million names per month. In other embodiments, the system 100 may accommodate more than one hundred clients 120 and/or may allow the clients 120 to pose up to another advantageous number of queries and/or extracted names per given time period. In still further embodiments, the system 100 may provide multiple sample databases 140 for use by one or more clients 120.

Starting at the bottom of FIG. 2, a plurality of clients 120', 120'', 120''', 120'''' access the business intelligence 126 and/or campaign management 125 tools for testing and refining their respective campaign strategies. A firewall 210 allows access to the system for clients 120 with approved campaign credentials and protects computers used by the individual clients from improper access by others.

The clients 120', 120'', 120''', 120'''' access the campaign web application server 220 and are given access to their respective partitions. In some embodiments, the clients 120', 120'', 120''', 120'''' can connect using a Virtual Private Network (VPN) and/or can use vendor specific user credentials. In one embodiment, access to the campaign server 240 is controlled by an Access Control List (ACL) 230, such as an ACL that makes use of a password or other identifier to correctly authenticate a client 20 wishing to access the system 100, as will be understood by one of ordinary skill in the art in light of the present disclosure. The campaign server 240 accesses the data stored in the sample database server 140 in order to carry out the queries, tests, report generation, and the like that may be requested by the individual clients 120. Once again, communications between the sample database server 140 and the campaign server 240 is controlled by means of an ACL 250. In some embodiments, the sample database server 140 can be implemented using a relational database, such as IBM DB2, Sybase, Oracle, CodeBase and Microsoft® SQL Server as well as other types of databases such as, for example, a flat file database, an entity-relationship database, and object-oriented database, and/or a record-based database.

Thus, clients gain the benefits typically associated with a custom test and execution database system that includes their own data as well as very up-to-date generic consumer data without a substantial delay for database build time and without the very costly up-front financial investment that are typically associated with proprietary databases.

Furthermore, as was described with reference to FIGS. $1B_1$, $1B_2$, and 1B3 above, in some embodiments, in addition to having access to different proprietary data 142, 143, different clients may also be provided with access to different portions of the core consumer data 141 in the sample database 140. For example, one or more clients 120 planning a first type of campaign may be allowed access to all of the data in the core consumer data 141, while clients 120 planning a second type of campaign may be allowed access to a portion of the data in the core consumer data 141. Furthermore, in some embodiments, a given client 120 may be allowed access to all of the data in the core consumer data 141 for a first type of campaign, while the same client 120 may, at the same time, be allowed access to only a portion of the data in the core consumer data 141 for use in planning a second type of campaign. In one embodiment, access control to the data in the core consumer data 141 of the sample database 140 is implemented, at least in part, using the various schemas for the various clients 120, as depicted in FIG. 2.

Figure 3:
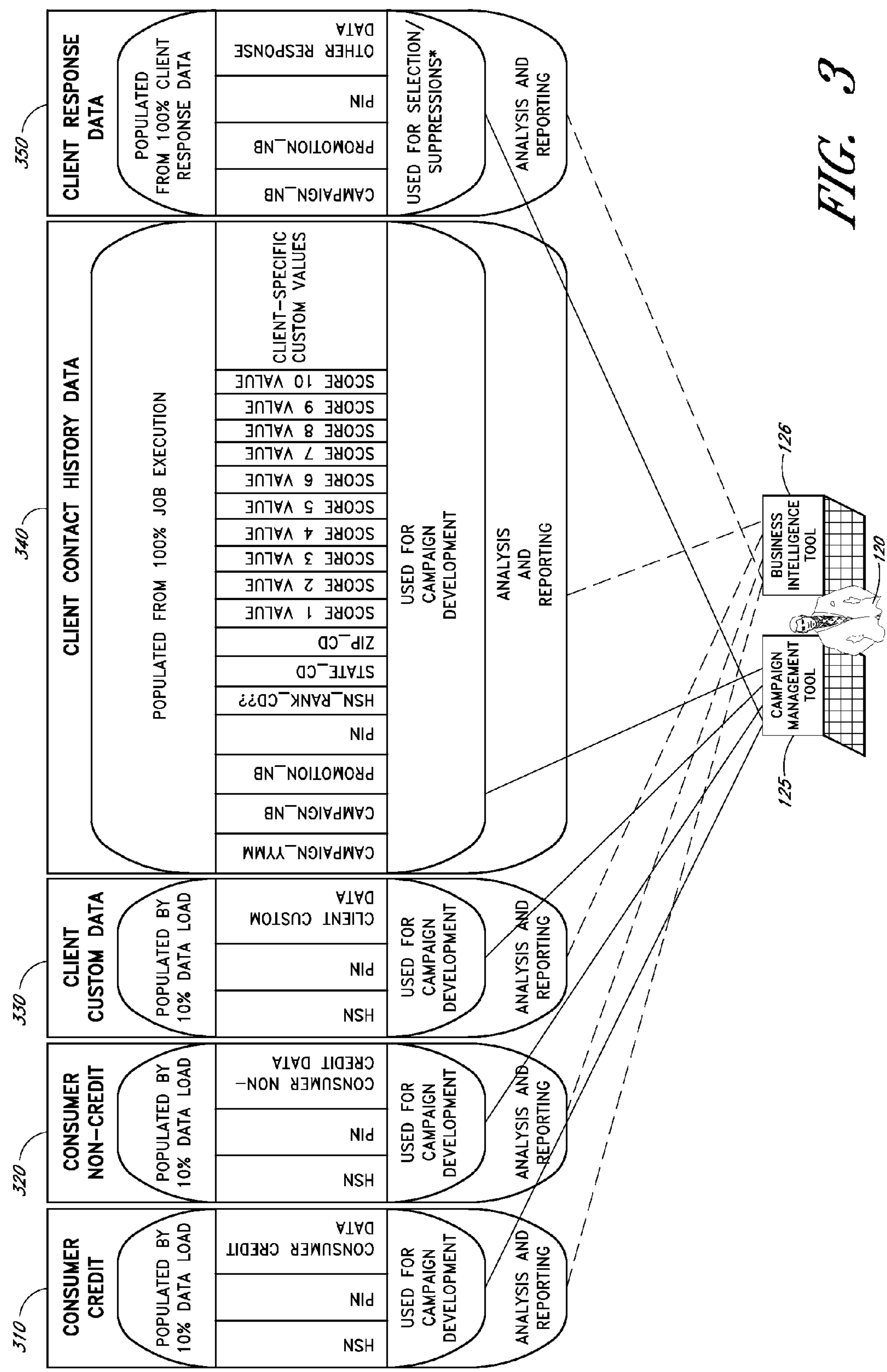
FIG. 3 is a diagram that depicts one embodiment of a selection of data from the credit database to be included in the "snapshot" sample.

FIG. 3 is a diagram that depicts one embodiment of a selection of data from the credit database to be included in the "snapshot" sample database 140. In the embodiment shown, the following types of data are included: consumer credit information 310, consumer non-credit information 320, client custom data 330, client contact history data 340, and client response data 350. In some embodiments, the client 20 uses the campaign management software tool 125 for campaign development and/or the business intelligence tool 126 for analysis and reporting. The consumer credit information 310 and the consumer non-credit information 320 both come as part of the 10% sample data load from the generic attributes 111 in the consumer data warehouse 110. Together, they make up the consumer core data 141 depicted in FIGS. $1B_1$, $1B_2$, $1B_3$ and FIG. 2. In this embodiment, each record in the consumer credit information 310 and the consumer non-credit information 320 includes a household identifier (HSN), a personal identifier (PIN), and a selection of consumer attributes. The client custom data 330 is stored in the repository of proprietary attributes 142 depicted in FIGS. $1B_1$, $1B_2$, and $1B_3$. In this embodiment, each record in the client custom data 330 includes a household identifier (HSN), a personal identifier (PIN), and a selection of proprietary consumer attributes. In various embodiments, client custom information may not include consumer name, street address or encrypted PIN information, and does include, for each consumer, an element, such as zip code, that can be matched to data within the sample database 141 and the consumer data warehouse 110. The client contact history data 340 and the client response data 350 may both come from the copy of the other client data 143 in the sample database 140, which includes data about the full population of consumers. These data sources are used, for example, to filter campaign results based on past contact history and client response information. The past contact history and client response information may indicate that if a given consumer appears in the list of campaign results, the consumer should be removed from list, for any of a variety of reasons. In some embodiments, some of the data from the client provided data 330, 340, 350 records may not be used for campaign development, in order to comply with federal and other regulations that control the use of credit-related data for advertising purposes.

In one embodiment, a sample test environment is built that represents data from a random 10% of a consumer credit database. The 10% test environment may be used for analysis, campaign development, campaign set-up, and for executing, auditing and reporting on logic proposed for the campaign. The client 120 may review results of the above and may approve or decline to approve execution of the proposed campaign strategy on the full and most recently updated version of the consumer credit database. If the client 120 declines approval, the client may choose to modify and re-test the campaign strategy one or more times until a desired campaign strategy is achieved. Thus, the full campaign executes the desired campaign strategy in the 100% environment of the full consumer data warehouse 110.

Although the foregoing systems and methods have been described in terms of certain preferred embodiments, other embodiments will be apparent to those of ordinary skill in the art from the disclosure herein. For example, in some embodiments, it may be desirable to add one or more demographic tables to allow for development of Invitation to Apply (ITA) lists (non-credit data lists) for direct marketing campaigns by clients. In some embodiments, credit data from more than one credit bureau may be available for use in connection with the systems and methods described herein.

Furthermore, although the systems and methods disclosed herein have been described by way of embodiments in which the clients 120 are typically credit providers or marketers working to plan direct marketing campaigns on their behalf, other embodiments, in which clients 120 are other types of business entities who wish to make use information from the consumer data warehouse 110, especially for planning direct marketing campaigns, are also envisioned.

IV. Operation

Figure 4:
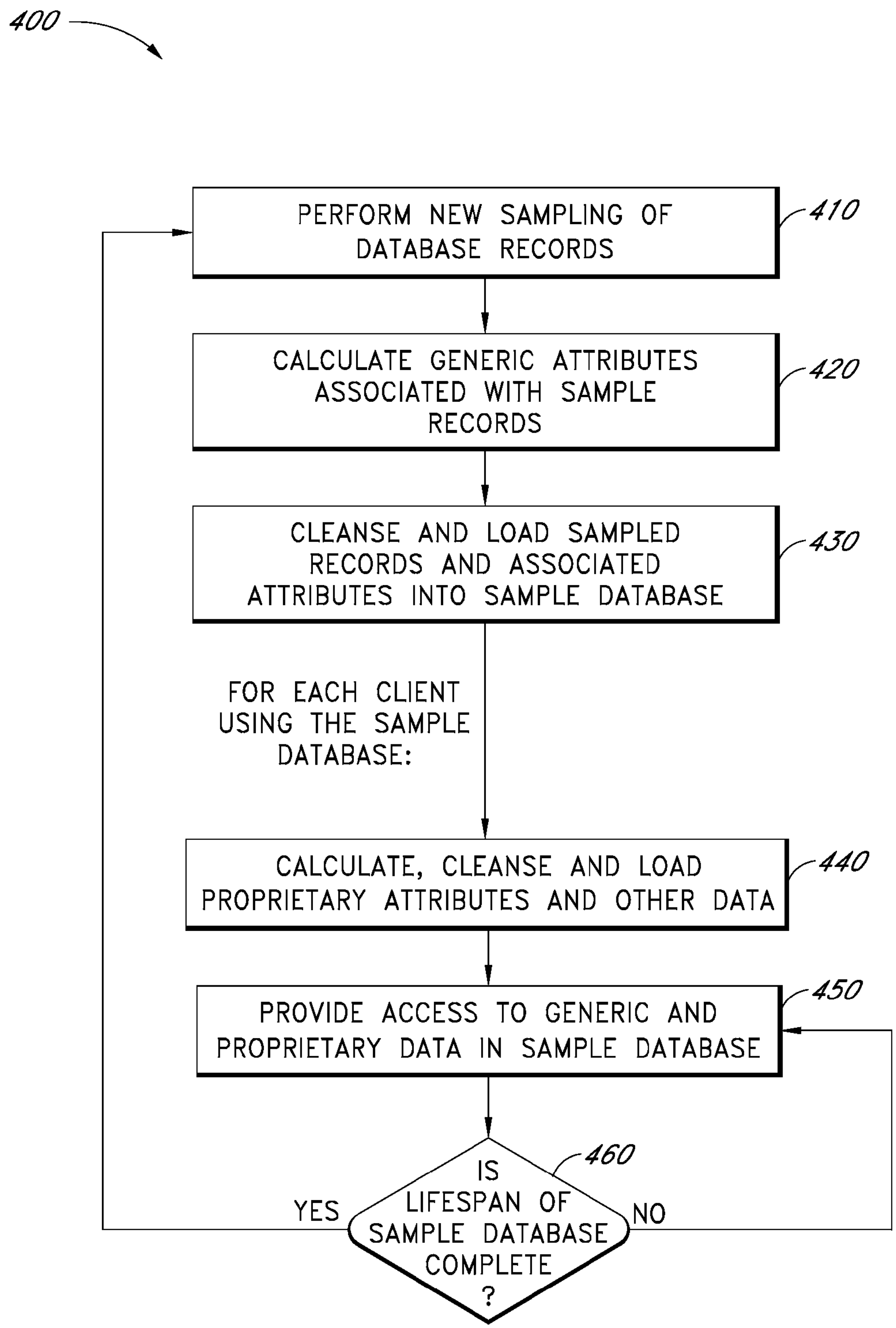
FIG. 4 is a flowchart depicting one embodiment of a process for generating and maintaining a sample database environment.

FIG. 4 is a flowchart depicting one embodiment of a process 400 for generating and maintaining a sample database environment 140. In block 410, the system 100 performs a sampling of the records in the credit-related database 102. In preferred embodiments, the sampling includes data about a portion of the records in the credit-related database 102. The data may include some or all of the attributes and other data stored for the sampled records. In some preferred embodiments, the sampling includes data about a percentage or fraction of the records, such as 10% of the records, or another percentage of the records in the range of 5%-25% of the records. In some embodiments, the sampling is a randomly selected portion of the records in the credit-related database 102. In other embodiments, the sampling may be selected partially randomly, such as by segmenting the records in the credit-related database 102 and by randomly selecting a portion of the records from one or more of the segments.

In block 420, the system 100 calculates one or more generic attributes associated with the sampled records. The generic attributes may be calculated from attribute definitions stored in one or more generic attribute views 111 and commonly available to clients 120 of the system 100.

In block 430, the data load module 150 of the system 100 cleanses and loads data from the sampled records and the associated attributes. For example, undesirable or unnecessary attributes, such as name, address, other contact information, and the like may be removed from the sample being used for the sample database 140 in order to comply with rules and regulations that govern the use of credit-related data. Attributes may also be removed from the sample data in order to decrease the size of the sample database 140, so that building and running tests on the sample database 140 may be carried out efficiently and expeditiously.

The processes in blocks 440 and 450 are carried out individually for each client 120 using the sample database 140. In block 440, the data load module 150 of the system 100 cleanses and loads client-proprietary attributes, such as those stored in the client's client view 112, deleting undesirable or unnecessary attributes. The data load module 150 may also load other attributes defined by the client for use in the current campaign strategy and/or may load other client data 143 provided by the client 120.

In block 450, the system 100 provides the client 120 with access to the sample database 140, including the generic 141 and the proprietary 142, 143 data. As was described with reference to FIG. 2, the sample database 140 is advantageously configured, using a system of one or more partitions, firewalls, Access Control Lists (ACLs), and/or other security measures to provide access to the same generic data 141 to a plurality of clients 120, simultaneously or near-simultaneously. Additionally, each client 120 may access and use their own client-proprietary data in conjunction with the generic data, without danger that there client-proprietary data will unintentionally become available to other clients 120. This configuration provides for a shared database 140 that economically and efficiently provides a shared environment for campaign testing, while also providing the benefits of a usually much costlier custom testing environment that also for the secure inclusion of proprietary attributes and other information in the campaign strategy testing.

In block 460 the system 100 determines if a lifespan associated with the current version of the sample database 140 is complete. As one example, in embodiments in which the sample database 120 is updated weekly, the lifespan is one week. If the lifespan associated with the current version of the sample database 140 is not yet complete, the system 100 continues to provide the clients 120', 120'', 120''' with access to the sample database 140. If the lifespan associated with the current version of the sample database 140 is complete, the process 400 returns to block 410 where the system 100 creates a new version of the sample database 140 to replace the previous version.

Figure 5:
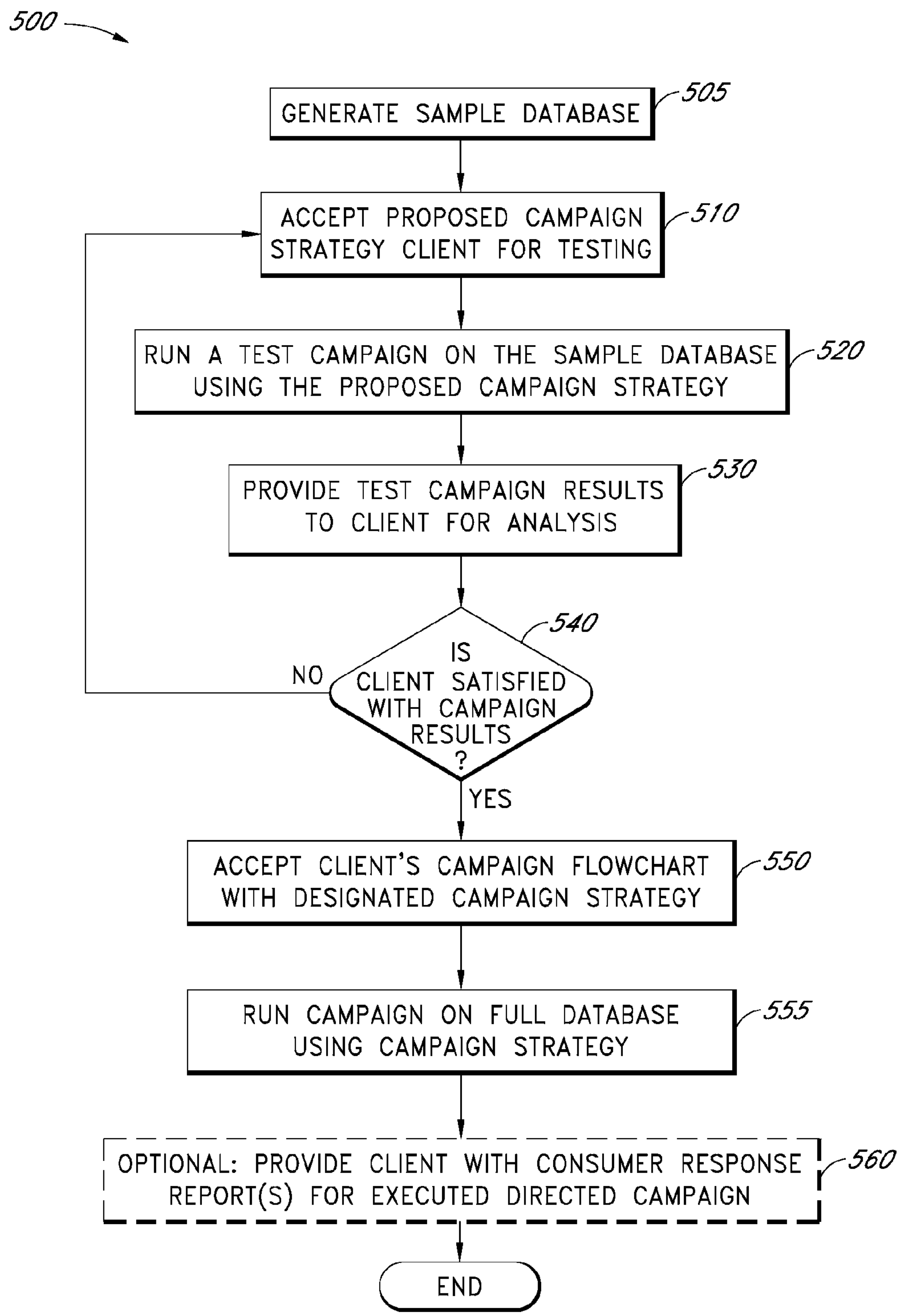
FIG. 5 is a flowchart that depicts one embodiment of a process 500 for using the sample database environment to assist a client 120 to test, analyze, refine, and execute a marketing campaign.

FIG. 5 is a flowchart that depicts one embodiment of a process 500 for using the direct marketing campaign planning environment to assist a client 120 to test, analyze, refine, and execute a marketing campaign, in accordance with some embodiments disclosed herein.

In block 505, the system 100 generates a sample database 140 test environment, as has been described with reference to FIG. 4 and elsewhere throughout the present disclosure.

In block 510, the system 100 accepts from the client 120 a proposed set of campaign selection rules to be tested for implementing a campaign strategy. The goal of the campaign strategy may be to identify good prospects for a direct marketing campaign. The goal of the testing may be to identify selection rules, also known as prospect selection criteria, that can successfully identify from the sample database 140 a desired set of prospects for the campaign and that can thus be predicted to identify from the full database of consumer data 110 a desired set of prospects for the campaign being planned. The selection rules may, in some embodiments, be formatted as a database query based on attributes associated with records in the sample database 140 test environment. In some embodiments, the campaign management tool 125 and the business intelligence tool 126 can be configured to provide the client 120 with a data dictionary that describes various categories of attributes available for segmenting the consumer populations, such as mortgage-related attributes, credit-related attributes, various proprietary attributes, and/or the like.

In block 520, the system 100 runs, on behalf of the client 120, a test campaign on the sample database 140 using the proposed campaign selection rules. In some embodiments, the campaign management tool 125 and the business intelligence tool 126 can be configured to access a sample client view 144 of the sample database 140. The sample client view 144 can be configured to include data from the repository of core consumer data 141, repository of client pre-calculated data 142, and repository of other client data 143. In some embodiments, the campaign management tool 125 and/or business intelligence tool 126 can be configured to provide the client 120 with a GUI that provides a query interface to run, name, construct, save, and/or reuse queries for the sample database 140. The queries can, in some embodiments, correspond to campaign selection rules. In some embodiments, the query interface can be configured to provide the client 120 with the ability to record and modify campaign selection rules for future.

In block 530, the system 100 provides results of the test campaign performed as described in block 520 to the client 120 for analysis. The campaign management tool 125 and/or business intelligence tool 126 can be configured to allow the client 120 to conduct high-level campaign development functions, such as segmentation of the consumer population, selection of one or more segments, and/or suppression of one or more segments or one or more individual consumers from the selection results, using individual, household, and/or other criteria. The campaign management tool 125 and/or business intelligence tool 126 can also be configured to generate reports based at least in part on information obtained from the sample database 140, and/or to perform other research and analysis functions associated with testing and refining the proposed direct marketing campaign. In some embodiments, the campaign management tool 125 and/or business intelligence tool 126 can be configured to generate reports predicting the response to the direct marketing campaign within a segment or group of segments of the targeted population.

In block 540, the system 100 receives from the client 120 an indication as to whether it is satisfied with the campaign strategy. If the client 120 is not satisfied, and if the lifespan of the sample database 140 is not yet expired, then the process 500 returns to block 510, and the testing and refining process can be repeated. The client 120 may modify and update the campaign selection rules and re-run the test campaign using new prospect selection criteria. In some embodiments, if the client 120 is not satisfied, and if the lifespan of the sample database 140 has expired, then the client 120 may continue testing the campaign selection rules once the sample database 140 has been rebuilt using a new randomly selected portion of the consumer data warehouse 110.

Alternatively, if, in block 540, the client 120 is satisfied with the results of the current set of prospect selection criteria, the process 500 moves to block 550 where the client 120 can provide a campaign flowchart 121. The campaign flowchart 121 can be configured to specify the desired campaign strategy.

In block 555, the campaign flowchart 121 is used as a specification for running a direct marketing campaign on the full consumer data warehouse 110 using the selection criteria identified during the testing on the sample database 140. In some embodiments, the project manager 130 accepts the campaign flowchart 121 from the client 120 and causes the campaign to be executed on the full consumer data warehouse 110. In some embodiments, the campaign with the tested selection criteria may be run on full consumer data warehouse 110 directly by the client 120 and/or may be run on another database of consumer information In block 560, the system 100 may optionally provide the client 120 with one or more consumer response reports associated with the direct marketing campaign. In some embodiments, the campaign management tool 125 and/or business intelligence tool 126 can be configured to provide the client 120 with consumer response reports received in connection with one or more direct marketing campaigns actually carried out. The consumer response reports may provide an analysis of consumer responses received from a direct marketing campaign. In some embodiments, the reports may summarize results over periods of time, including shorter comparison periods in the immediate weeks after a campaign is executed, and/or longer time frames, such as years after the campaign has completed.

The reports may provide flexibility to perform analysis of various levels and/or categories of summarization, which may include, but are not limited to: customer segments, product line, product campaign, promotion, offer, collateral, media, and/or vendor. In some embodiments, a client data maintenance service 165 can also be configured to store campaign-related data from executed campaigns that can, in some embodiments, be utilized for future campaigns. In some embodiments, the other client data 113 and/or repository of other client data 143 can be configured to store the campaign-related data for use in future campaigns.

IV. Various Embodiments of System and Method Implementations

In various embodiments, the systems and methods for providing a direct marketing campaign planning and execution environment may be embodied in part or in whole in software that is running on one or more computing devices. The functionality provided for in the components and modules of the computing device(s), including computing devices included in the system 100, may comprise one or more components and/or modules. For example, the computing device(s) may comprise multiple central processing units (CPUs) and a mass storage device(s), such as may be implemented in an array of servers. In one embodiment, the computing device comprises a server, a laptop computer, a cell phone, a personal digital assistant, a smartphone or other handheld device, a kiosk, or an audio player, for example.

In general, the word “module,” “application”, or “engine,” as used herein, refers to logic embodied in hardware and/or firmware, and/or to a collection of software instructions, possibly having entry and exit points, written in a programming language, such as, for example, Java, Ruby, Ruby on Rails, Lua, C and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information, including credit data and/or non-credit data. This database or databases may be implemented using a relational database, such as Sybase, Oracle, CodeBase and Microsoft® SQL Server as well as other types of databases such as, for example, a flat file database, an entity-relationship database, and object-oriented database, and/or a record-based database.

In one embodiment, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In one embodiment, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices.

In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the invention. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the invention.

What is claimed is:

1. A system for allowing at least one client to plan and execute a direct marketing campaign, the system comprising:

a computing system comprising one or more computing devices;

a non-transient computer readable storage storing:

a consumer credit database of governmentally regulated consumer credit information comprising a plurality of records with information about a plurality of consumers;

a test database comprising a copy of a subset of the governmentally regulated consumer credit information from the consumer credit database, the copy of the subset containing a substantially smaller subset of the plurality of records of the consumer credit database;

an extraction and data load module, stored in a non-transitory computer memory, configured to:

load a set of generic attributes from the consumer credit database into the test database, load a set of custom attributes from the consumer credit database into the test database;

load consumer core data comprising extracted sample data into the test database; and, depersonalize the consumer core data before loading the consumer core data into the test database by:

removing identification information of the plurality of consumers whose records were among the extracted sample data from the consumer core data, replacing the removed identification information with anonymous identifier numbers, and removing contact information corresponding to the plurality of consumers whose records were among the extracted sample data from the consumer core data;

the computing system programmed to implement a client testing interface that allows a plurality of clients to directly access the test database and to individually run one or more tests of prospect selection criteria using the test database in order to identify a desired set of prospect selection criteria wherein the client testing interface is configured to:

load a first set of proprietary data of a first client of the plurality of clients into the test database, allow the first client to access the generic attributes, custom attributes and depersonalized consumer core data in conjunction with the loaded first set of proprietary data, load a second set of proprietary data of a second client of the plurality of clients into the test database, allow a second client to access the generic attributes, custom attributes and depersonalized consumer core data in conjunction with the loaded second set of proprietary data, only permit access to the first set of proprietary data stored in the test database to the first client, and only permit access to the second set of proprietary data stored in the test database to the second client and, second software instructions that when executed generate a campaign interface configured to extract consumer information from the consumer credit database based, at least in part, on the desired set of prospect selection criteria for use by at least one of the plurality of clients in a direct marketing campaign.

2. The system of claim 1, wherein the test database is updated less frequently than the consumer credit database.

3. The system of claim 1, wherein the subset of the governmentally regulated consumer credit information from the consumer credit database comprises information from ten percent of the consumer records in the consumer credit database.

4. The system of claim 1, wherein the subset of the consumer credit information from the database comprises credit-related and non-credit related information.

5. The system of claim 1, wherein the proprietary data includes at least one of: information from past direct marketing campaigns, past contact history for a consumer, and past response information for a consumer.

6. The system of claim 1, wherein the client testing interface is further configured to allow the plurality of clients to access the test database simultaneously.

7. A method for planning and executing a first direct marketing campaigns, the method comprising:

accessing, by a computer system comprising one or more computing devices, a consumer credit database of governmentally regulated consumer credit information comprising a plurality of records with information about a plurality of consumers;

periodically copying, by the computer system, a substantially smaller subset of the plurality of records with information about a plurality of consumers;

depersonalizing, by the computer system, the copied plurality of records, thereby creating depersonalized generic data;

receiving, by the computer system, a first set of proprietary data owned by a of the first client planning and executing a first direct marketing campaign, the first set of proprietary data comprising first custom attributes defined by the first client for the first direct marketing campaign;

receiving by the computer system, a second set of proprietary data owned by a second client planning and executing a second direct marketing campaign, the second set of proprietary data comprising second custom attributes defined by the second client for the second direct marketing campaign;

creating, by the computer system, a test database by loading and combining:

the periodically copied and depersonalized generic data, the received first set of proprietary data, and the received second set of proprietary data;

generating, by the computer system, a testing interface that:

allows the first client to directly access the test database and to run one or more first tests of prospect selection criteria using the test database in order to identify a first desired set of prospect selection criteria wherein the client testing interface is configured to allow the first client to access the first set of proprietary data, and block the second client from accessing the first set proprietary data loaded in the test database, and allows the second client to directly access the test database and to run one or more second tests of prospect selection criteria using the test database in order to identify a second desired set of prospect selection criteria wherein the client testing interface is configured to allow the second client to access the second set of proprietary data and block the first client from accessing the second set of proprietary data loaded in the test database; and generate, by the computer system, a campaign interface configured to extract consumer information from the consumer credit database based, at least in part, on the first desired set of prospect selection criteria for use by the first client in the first direct marketing campaign or the second desired set of prospect selection criteria for use by the first client in the first direct marketing campaign.

8. The method of claim 7, wherein the test database is updated less frequently than the consumer credit database.

9. The method of claim 7, wherein the periodically copied substantially smaller subset of the plurality of records comprises information from ten percent of the consumer database.

10. The method of claim 7, wherein the first or second direct marketing campaign is for a firm offer of credit.

11. The method of claim 7, wherein the first or second direct marketing campaign is for an Invitation to Apply (ITA) offer.

12. The method of claim 7, wherein the first set of proprietary data includes at least one of: information from past direct marketing campaigns of the first client, past contact history with the first client for a consumer, and past response information for a consumer with respect to the first client.

13. A non-transitory, tangible, computer readable medium storing software instructions that when executed cause a computer system to:

access a consumer credit database of consumer credit information comprising a plurality of records with information about a plurality of consumers;

copy a substantially smaller subset of the plurality of records with information about a plurality of consumers;

depersonalize the copied plurality of records, thereby creating depersonalized generic data;

create a test database comprising the copied and depersonalized generic data;

receive first proprietary data of a first client that is planning and executing a first marketing campaign;

depersonalize the first proprietary data;

load the received and depersonalized first proprietary data into the test database, thereby combining the depersonalized first proprietary data with the depersonalized generic data;

receive second proprietary data of a second client that is planning and executing a second marketing campaign;

depersonalize the second proprietary data;

load the received and depersonalized second proprietary data into the test database, thereby combining the depersonalized second proprietary data with the depersonalized first proprietary data and the depersonalized generic data; and generate a testing interface that allows the first client to directly access the test database to identify a desired set of prospect selection criteria wherein the testing interface is configured to allow the first client to access the depersonalized first proprietary data loaded into the test database and to block the first client from accessing the second depersonalized proprietary data loaded into the test database.

14. The computer readable medium of claim 13, wherein the test database is updated less frequently than the consumer credit database.

15. The computer readable medium of claim 14, wherein the consumer credit database is updated twice as frequently as the test database.

16. The computer readable medium of claim 13, wherein the test database comprises information from ten percent of the consumer database.

17. The computer readable medium of claim 13, wherein the first direct marketing campaign is for a firm offer of credit.

18. The computer readable medium of claim 13, wherein the first direct marketing campaign is for an Invitation to Apply (ITA) offer.

19. The computer readable medium of claim 13, wherein the first proprietary data includes at least one of: information from past direct marketing campaigns of the first client, past contact history with the first client for a consumer, and past response information for a consumer with respect to the first client.

20. The computer readable medium of claim 13, wherein the client testing interface is further configured to allow the first and second client to access the test database simultaneously.

* * * * *

UNITED STATES PATENT AND TRADEMARK OFFICE

CERTIFICATE OF CORRECTION

PATENT NO. : 8,606,626 B1
APPLICATION NO. : 12/022874
DATED : December 10, 2013
INVENTOR(S) : DeSoto et al.

It is certified that error appears in the above-identified patent and that said Letters Patent is hereby corrected as shown below:

In the Specification

In column 19 at line 63, Change “information” to --information.--.

In the Claims

In column 23 at line 2, In Claim 1, change “client” to --client;--.

In column 23 at line 27, In Claim 7, after “executing” delete “a first direct”.

Signed and Sealed this
Ninth Day of December, 2014

Michelle K. Lee
*Deputy Director of the United States Patent and Trademark Office*